(12) United States Patent
Blasko et al.

(10) Patent No.: US 6,466,928 B1
(45) Date of Patent: Oct. 15, 2002

(54) METHOD AND APPARATUS FOR IDEA DEVELOPMENT AND EVALUATION

(75) Inventors: Kelly Ann Blasko, Pittsboro; Lester Lynn White, Raleigh; Walden Blaine Crabtree, Wendell; Tony Michael O'Driscoll, Raleigh, all of NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 08/777,593

(22) Filed: Dec. 31, 1996

(51) Int. Cl.[7] .................................................. G06N 5/00
(52) U.S. Cl. ............................................ 706/46; 707/505
(58) Field of Search .......................... 706/46; 345/338, 345/337, 13, 326, 333, 340; 707/505; 348/13; 434/336; 364/528

(56) References Cited

U.S. PATENT DOCUMENTS

| | | | | |
|---|---|---|---|---|
| 4,004,354 A | * | 1/1977 | Yamaguchi | 434/336 |
| 4,595,982 A | * | 6/1986 | Burt | 706/46 |
| 4,648,062 A | * | 3/1987 | Johnson et al. | 345/338 |
| 4,697,242 A | * | 9/1987 | Holland et al. | 706/13 |
| 4,905,080 A | * | 2/1990 | Watanabe et al. | 348/13 |
| 4,926,255 A | * | 5/1990 | Von Kohorn | 348/13 |
| 4,984,152 A | * | 1/1991 | Muller | 345/333 |
| 5,155,806 A | * | 10/1992 | Hoeber et al. | 345/338 |
| 5,157,768 A | * | 10/1992 | Hoeber et al. | 345/338 |
| 5,287,448 A | * | 2/1994 | Nicol et al. | 345/337 |
| 5,434,963 A | * | 7/1995 | Kuwamoto et al. | 345/338 |
| 5,434,965 A | * | 7/1995 | Matheny et al. | 345/338 |
| 5,537,618 A | * | 7/1996 | Boulton et al. | 345/326 |
| 5,546,521 A | * | 8/1996 | Martinez | 345/338 |
| 5,566,291 A | * | 10/1996 | Boulton et al. | 345/326 |
| 5,615,134 A | * | 3/1997 | Newsham et al. | 364/528 |
| 5,621,430 A | * | 4/1997 | Bricklin | 345/340 |
| 5,701,400 A | * | 12/1997 | Amado | 706/45 |
| 5,704,029 A | * | 12/1997 | Wright, Jr. | 707/505 |
| 5,715,415 A | * | 2/1998 | Dazey et al. | 345/338 |
| 5,754,176 A | * | 5/1998 | Crawford | 345/338 |

OTHER PUBLICATIONS

Gery, Gloria, "Customer Services (Accounts)—American Express", Electronic Performance Support Systems, 1991.
Gery, Gloria, "Software Development—IBM Corporation", Electronic Performance Support Systems, 1991.

* cited by examiner

Primary Examiner—Wilbert L. Starks, Jr.
(74) Attorney, Agent, or Firm—Nortel Networks

(57) ABSTRACT

Disclosed are apparatus and methods for evaluating a business proposal in which a computer is used to perform the steps of presenting questions regarding the business proposal, using information gathered from responses to these questions to determine a score for the proposal, and then providing this information and score for evaluation of the proposal.

24 Claims, 22 Drawing Sheets

Idea Generation Information Page

Galileo: New Idea Phase

Galileo Phases
[1. New Idea] [2. Development] [3. Rating] [4. Assessment]

Galileo Tools
[Guide 📖] [Advisor ?]

Page: Submitter Information

Part 1: Submitter Information (Required):

Employee Name    John           Doe
                 First          Last

Employee Number  1656434

Department Number  6014

Phone Number (esn-### ####):  294-2025

Electronic Mail Address:  jdoe@nortel.com

Are you submitting this idea for someone else who generate the idea (Check One)?  Yes ○  No ●

[Quit]                                                                    [Next Page]

FIG. 4

Galileo: New Idea Phase

Current Galileo Phases
[1. New Idea] [2. Development] [3. Rating] [4. Assessment]

Galileo Help
[Guide] [Advisor ?]

To go back to a specific question, double click on the line with the question # or click once on the line with the Question # and press the Select button.

Phase: 1. New Idea Questionnaire
Section: Overview Questions
Page: Response Summary Summary of New Idea Questionnaire Responses Idea Name: Mobile Access To Information
Galileo idea input: Phase 1
Summary of ratings and responses to questions:
Question #5
Rating: 3
Q5: Question How would this idea improve end-user productivity?
Your response was:
End-user would never be at a loose end. Pertinent information would always be available irregardless of where the person is at the time.
Question #2
Rating: 4
Q2: Question Who would use this product/service idea? Describe the end-user for this idea.
Your response was:
Service Providers can generate extra revenue by being resellers of the numerous services that could be provided on this platform. Also they get ext . . .
Question #3
Rating: 4
Q3: Question What end-user needs would be met with this idea?

[Quit] [Home Page] [Print] [Select]

Advisor

Advisor Information for Question 1

Question 1a
What steps have you taken to determine that this idea does not exist today within Nortel?

*Purpose*
The purpose of this question is to ensure that no duplication of effort occurs with regards to the development of similar new product or service ideas.

*Context*
This question is asking you to ensure that you have verified that your idea has not already been implemented within Nortel. If you do not successfully complete this step you may spend many hours conducting research to develop your idea only to find

Question 1b
This idea has not been implemented by Nortel.

*Suggested Responses*
1) Strongly Disagree - I have found many sources that clearly describe existing implementations of my idea within Nortel
2) Disagree - I have found one or two sources that describe an existing implementation of my idea within Nortel
3) Neutral - I have found many sources that describe existing implementations of an idea similar to mine within Nortel
4) Agree - I have found one or two sources that describe existing implementations of

[ Exit Advisor ] [ Print ]

*FIG. 10*

Phase 2 Advisor Information for Template 2, Question 1

Advisor

| Question 1 | Question 2 | Question 3 |

Click buttons on the right to go to specific question of Template 2

Advisor Information On Template 2, Question 1

Question 1. Provide at least 3 examples of how end-users would benefit from using this product/service.

*Purpose*
The purpose of this question is to gather more complete information on the benefits of the product/service idea from an end-user perspective. This information will be used later in developing a Marketing Plan for the new product/service.

*Definitions*
Benefits: Those attributes of the product/service that the end-user deems to be value-added.
End-Users: Those individuals who will use the product or service you provide.

*Context*
This question is asking you to build upon the information you provided in the first phase of the Galileo process. More detail as to the benefits that end-users would gain from using this product/service is required. The more specific you can be at this stage, the better.

Click a button on the right to view answers to a related question

| Phase 1 - Question 2 |
| Phase 1 - Question 3 |

| Exit Advisor |
| Print |

*FIG. 14*

Phase 3 Advisor Information of Category 1

| Advisor |

Click buttons on the right to go to specific statements in Category 1

Overview | 1 | 2 | 3 | 4 | 5

Advisor Information On Category 1, Statement 1

Statement 1. Potential end-users have a great need for this type of product/service.

*Context*
Question 1 asks you to review the questions you have already completed regarding end user needs and to indicate your degree of agreement with the statement.

*Related Questions*
The following questions are ones you have already completed that relate to the current rating question.
Phase 2, Template 2, Question 1,
Phase 2, Template 3, Question 1,
Phase 2, Template 3, Question 2.
To view your responses to these questions, click on the question links at the bottom of the screen.

Click a button on the right to view answers to a related question

| Phase 2 - T.2, Q.1 | Phase 2 - T.2, Q.2 |
| Phase 2 - T.3, Q.1 | Phase 2 - T.3, Q.2 |

| Exit Advisor |
| Print |

*FIG. 18*

METHOD AND APPARATUS FOR IDEA DEVELOPMENT AND EVALUATION

BACKGROUND OF THE INVENTION

The present invention relates generally to an electronic performance support system and specifically to an electronic performance support system which aids a user in developing and evaluating ideas.

Most companies have a new product development process involving a systematic, disciplined approach to transform an idea into a product. The weak link in most of these processes involves selecting ideas for development. This selection often relies on intuition or visceral reactions. In fact, in the industry, the initial stage of the new product development process is often referred to as the "Fuzzy Front End." The Fuzzy Front End is traditionally viewed as the vague area where decisions regarding the market viability of a new product or service idea are made based upon visceral experience rather than disciplined analysis.

These existing new product development processes have further drawbacks. They often require, for example, costly cross-functional expert teams to sufficiently develop ideas into workable concepts. In addition, they often lack an efficient and consistent way to present information to high-level managers whose time may be limited. Finally, to the extent these processes lead to a conclusion regarding the possible success of an idea, the result is merely a go/no go decision. Such a result leaves high-level managers without a way to qualitatively assess the bases for that decision.

SUMMARY OF THE INVENTION

There is, therefore, a need for a system and method to systematically and efficiently develop new product and service ideas into robust concepts that may then be evaluated in an equally systematic and efficient manner.

Goals and advantages of the invention appear in the following description, and will be obvious from that description or by practicing the invention. The invention involves automatically qualifying, developing, rating, and assessing ideas in a structured format.

Specifically, a method according to this invention includes the steps of presenting a set of predefined questions regarding a proposal, obtaining a set of information about the proposal from responses to the questions, determining a score from the information in the set, determining, from the score, whether the set meets a predetermined minimum specification, and outputting the score and the obtained information for the purposes of evaluating the proposal.

A system according to this invention includes means for presenting a set of predefined questions regarding a proposal, means for obtaining a set of information from responses to the questions, means for determining a score from the information in the set, means for determining, from the score, whether the set meets a predetermined minimum specification, and means for outputting the score and the obtained information for the purposes of evaluating the proposal.

Both the foregoing general description and the following detailed description are exemplary and explanatory and do not restrict the invention as claimed. The accompanying drawings, which are incorporated in and constitute a part of this specification, illustrate embodiments of the invention and, together with the description, explain the principles of the invention.

BRIEF DESCRIPTION OF THE DRAWINGS

In the drawings,

FIG. 4 is a screen shot of a General Information Page;

FIG. 6 is a screen shot of a Summary Page for the Idea Qualification phase;

FIG. 9 is a screen shot of a Question Page for the Idea. Qualification phase;

FIG. 10 is a screen shot of an Advisor Information Page for the Question Page;

FIG. 14 is a screen shot of an Advisor Information Page for the Template Page;

FIG. 18 is a screen shot of an Advisor Information Page for the Category Page;

DETAILED DESCRIPTION

Figure 1A:
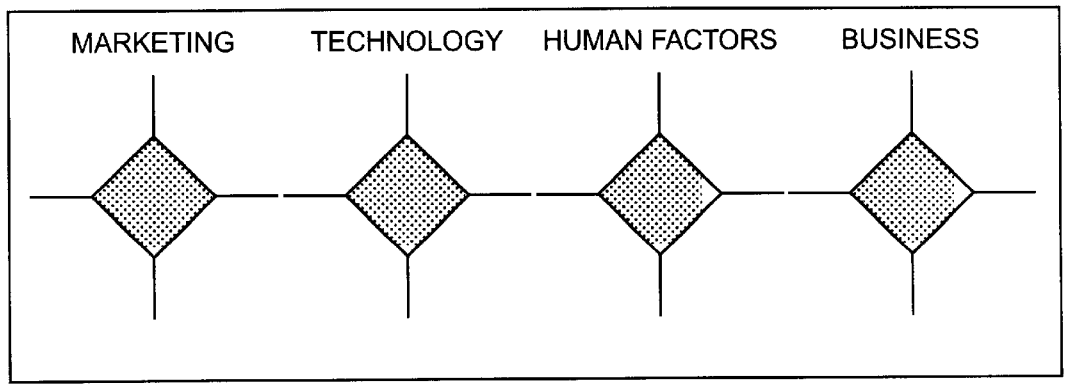
FIGS. 1(a) and (b) are diagrams-showing GEM charts.

Reference will now be made in detail to the preferred embodiments of the invention, examples of which are illustrated. in,the accompanying drawings. Wherever possible, the same reference numbers will be used throughout the drawings to refer to the same or like parts.

A. Overview

The Idea Development Process of the present invention proceeds in four phases. The originator of a product or service idea (Idea Generator) begins the process in the Idea Qualification phase. This first phase performs a pre-screening of the idea by asking the Idea Generator (IG), high-level qualitative and quantitative questions. If the quantitative ratings meet minimum requirements, the IG proceeds to the next phase, Concept Development. In this phase, the IG answers more detailed qualitative questions, or "templates," to aid in further developing the idea. The questions make the IG better able to rate the idea in response to detailed quantitative questions asked during a Concept Rating phase. In the final phase, Concept Assessment, an individual with the authority to approve or disapprove the new idea (Idea Evaluator) is presented with a compilation of the ratings entered by the IG during Concept Rating.

The Idea Development Process provides a number of benefits that demonstrate its usefulness. First, it forces the IG to complete the initial phases of the process before involving the Idea Evaluator in evaluating the concept for validity. This saves resources and time because Idea Evaluators typically tend to be senior-level managers whose time is both limited and expensive. Restructuring the process of developing ideas to move the contributions from Idea Evaluators to the latter stages of the process eliminates much of the overhead expenditures typically required for Fuzzy Front End analysis.

Second, the Idea Development Process is implemented to allow the IG to complete the first three phases of the process independently, without the cross-functional expert teams that typical Fuzzy Front End analysis requires. Those teams often consume much time, effort and funding. The Idea Development Process offsets the need for such expert teams by using a pre-determined set of questions which can be easily understood and completed by the Idea Generator.

Third, presenting the assessed concepts to the Idea Evaluator in a form directly comparable to other ideas that have been through the process reduces the time required for the Idea Evaluator to compare and contrast the concepts before making a final decision. Furthermore, collecting a number of assessed concepts provides data on the success of the concept after development and market introduction. Idea Evaluators can later use this data in evaluating similar concept assessments.

B. Idea Development Process

The Idea Development Process preferably includes four phases. The IG must complete the first three phases sequentially, Idea Qualification, Concept Development, and Concept Rating, before the Idea Evaluator participates in the Concept Assessment phase. Moreover, the IG must answer all questions in a current phase before proceeding to the next phase. Also, once the IG completes a phase and enters the next phase, the IG cannot make changes to any previous phases. The IG may, however, access previous phases to review answers.

1. Idea Qualification Phase

The purpose of the Idea Qualification phase is to pre-screen. a new product or service idea at a very high level. The Idea Qualification phase begins when an IG initiates a software program for the Idea Development Process that displays a form containing high-level questions designed to make certain that the IG has thought through a new idea's marketing, technical, human factors, and business feasibility. The following represent ten typical qualitative questions, denoted by (a), and their counterpart statements, denoted by (b), that the IG quantitatively rates.

1a. What steps have you taken to determine that this idea does not exist today within [company]?
1b. This idea does not currently exist with [company].
2a. Who would use this product/service idea? Describe the end-user for this idea.
2b. This idea meets specific end-user needs.
3a. What end-user needs would be met with this idea?
3b. End-users for this idea have been identified.
4a. What are the benefits of this idea over existing product/service alternatives to the end-user?
4b. This idea offers significant benefits over existing product service alternatives to the end-user.
5a. How would this idea improve end-user productivity?
5b. This idea would improve the productivity of the end-user.
6a. Who would provide this service/product to the end-user? Describe the service-provider for this service/product idea.
6b. Service providers for this idea have been identified.
7a. What are the benefits for service-provider in offering this product/service idea to end-users?
7b. This idea offers significant benefits over existing product/service alternatives to the service-provider.
8a. What steps have you taken to determine that this idea would succeed in the Marketplace?
8b. This idea would be readily adopted by the Marketplace.
9a. Could this product/service idea be implemented technically today? Describe how this would work.
9b. The technology required to implement this product/service exists today.
10a. Does this product/service idea align with [company]'s current product/service offerings?
10b. This idea is in alignment with [company's] current product/service offerings.

The software program presents each of the above pairs of questions in a specific order. First, the software program asks an open-ended question seeking a qualitative response (the (a) questions). Next, the program asks for a quantitative, such as a numeric, response indicating the IG's level of agreement or disagreement with a statement (the (b) statements). Forcing a qualitative response before requesting a quantitative rating ensures that the IG has thought about the question before rating it. In this way, the IG is not merely blindly rating the idea; rather, the reasoning required to answer the qualitative questions leads to a more informed rating of the associated quantitative statement.

After the IG completes the questions, the software program scores them on completeness. The program scores the questions according to a scoring algorithm and shares the results with the IG. Each quantitative-question has six possible ratings. Ratings one through five range from "strongly disagree" to "strongly agree" with a sixth "Cannot Answer" rating. The preferred scoring algorithm qualifies the idea if (a) fewer than two of the ten questions are given ratings of "6" (or "Cannot Answer"), and (b) the average numeric rating for the ten questions is greater than 65 percent. The program calculates the percentage as a straight arithmetic mean in which the ratings are numerically summed (with "Cannot Answer" or "6" ratings scored as zeros) then divided by the highest possible total score.

If the idea scores high enough, thereby qualifying it, the IG may proceed to the Concept Development phase. Otherwise, the IG may either choose to conduct additional research and re-answer the questions or discontinue the Idea Development Process.

2. Concept Development Phase

During the Concept Development phase, the IG can define and develop a new product or service idea for quantitative rating. The software program enables the IG to develop the idea by presenting additional questions, such as those in the twelve sets of questions presented below. For organizational purposes, related questions are grouped into "Templates."

Template 1. Visioning Exercise.

Please create 2 situations/scenes which would help someone visualize where, when, and how this product/service would be used by an End User, a Service Provider, or both.

Template 2. Overall Benefits.

2A) Provide at least 3 examples of how end-users would benefit from using this product/service.

2B) Provide at least three examples of how service-providers would benefit from offering this product/service.

2C) Provide at least 3 reasons why [company] should consider developing this product/service.

Template 3. Meeting Needs.

1) Based on the concept development activities to date, please review and revise the list of end-user needs that this product/service would meet.

2) List at least 3 advantages that end-users would gain by having their needs met by this product or service.

Template 4. Concept Description.

1) List the capabilities of this product/service in the table below.

2) Once the product/service capabilities have been determined, demonstrate how each capability meets specific end-user needs. (Number each list so that related items in the two lists match).

Template 5. User Profile

Given the scene development information, describe the specific characteristics of the end-users and service-providers whose needs would be met by this product/service.

Template 6. Trend Analysis

1) List the specific end-user and service-provider trends that this product/service aligns with. Describe why you believe that the trends align with your product/service.

2) Does this product/service best fit future or current trends? Please elaborate.

Template 7. Platform/Interface.

1) Describe how this product/service would save time for the end-user.

2) Describe how the interface of this product/service could be developed to best suit the needs of the end-user.

Template 8. Human Factors.

1) Describe the hardware/software platform(s) upon which this product/service would reside.

2) Describe how the end-user will operate this product/service.

Template 9. Application to [company]

1) Describe how this product/service leverages the current telecommunications infrastructure.

2) Describe how competitors could provide this product/service without having to rely on the traditional telecommunications infrastructure 3) Describe any innovations that would have to be developed in order to offer this service 4) List any regulatory issues that could impact the introduction of this product/service to the marketplace.

Template 10. Competition.

1) List any key competitors that [company] might face in offering this product/service.

2) Provide at least three reasons why [company] could compete successfully against these competitors with this new product/service.

Template 11. Strategic Alignment.

1) Provide at least 3 reasons why this product/service would be appropriate for [company] to develop.

2) Explain how this product aligns with telecommunications industry trends and how it complements [company]'s business focus.

Template 12. Concept Summary.

1) Provide at least 3 major strengths of the proposed product/service.

2) Provide at least 3 major weaknesses of the proposed product/service.

3) Describe at least 3 major opportunities that the proposed product/service provides.

4) Describe at least 3 major threats that [company] will face in implementing the proposed product/service.

5) Name at least 3 key factors which will have to be resolved in order to facilitate the development of this, product/service.

Each Template is designed to elicit in-depth analysis of a specific issue facing a new product or service idea, such as the idea's benefits, user profile, competition, and strategic alignment. For example, Template 1 presents a visioning exercise in which the IG is asked to create two situations that would help someone visualize where, when, and how the product or service idea would be used by an end-user or service provider. Template 3 asks the IG to list end-user needs that the product or, service idea would meet and the advantages to the end-user of having their needs met.

Each Template offers reference links, discussed later, to any questions and associated responses from the Idea Qualification phase that are relevant to the questions in the Concept Development phase. After completing the questions in all the Templates, the software program enters the Concept Rating phase of the Idea Development Process.

3. Concept Rating Phase

The Concept Rating phase provides a framework for rating new product or service ideas. The software program for the Concept Rating phase presents the IG with the following sixteen Categories of statements.

Category 1. End User Needs/Trends

1. Potential end-users have a great need for this type of product/service.

2. Potential end-users are not very satisfied with the product/service they are currently using to meet their needs.

3. End-user needs have been identified through external sources, such as marketing research reports or books on trends.

4. This type of product/service fits several societal trends.

5. This product/service meets demographic trends.

What is your level of confidence in the above set of ratings? Explain the reason(s) for your level of confidence in the above set of ratings.

Category 2. Potential Market

1. A market has been identified for this product/service.

2. This product/service is highly attractive for a broad, mass market (If score is 4 or 5, skip #3 and go to #4).

3. This product/service is highly attractive for a specifics niche market.

4. Demand exists today for this product type.

5. The number of end-users who want to use this product/service is growing very quickly.

What is your level of confidence in-the above set of ratings? Explain the reason(s) for your level of confidence in the above set of ratings.

Category 3. Concept Development
1. Solutions to any marketing, technical, human factors, and business issues are very clear at this stage.
2. This concept has been jointly refined by the customer and [company].
3. The original idea has gone through several refinements to become this stage.
4. This idea has been fully developed in all four areas (marketing, technical, human factors, and business.

What is your level of confidence in the above set of ratings? Explain the reason(s) for your level of confidence in the above set of ratings.

Category 4. Competitive Analysis
1. This product/service addresses needs currently unmet by competitive product/services.
2. Users do not have many competitive solutions (direct or substitute).
3. Providers of this product/service do not compete solely on price.
4. There are few competitors in this market that could offer this product/service.
5. New product introductions by competitors are rare for this type of product/service.

What is your level of confidence in the above set of ratings? Explain the reason(s) for your level of confidence in the above set of ratings.

Category 5. Technical Feasibility
1. The development of this product/service will require limited technological innovation.
2. This product/service is technically feasible.
3. The technical—aspects exactly how technical issues will be addressed—are very clear.
4. The product/service feature specifications are very clear at this time.
5. The technology required to develop this product/service is currently available.

What is your level of confidence in the above set of ratings? Explain the reason(s) for your level of confidence in the above set of ratings.

Category 6. Skill Set/Resource Availability
1. [company]'s R&D skills are more than adequate to develop this product/service.
2. [company]'s Engineering skills are more than adequate for this product/service.
3. [company]'s equipment and facilities are more than adequate to develop and test this product/service.
4. [company]'s product development and tracking processes lend themselves to the development of this product/service.

What is your level of confidence in the above set of ratings? Explain the reason(s) for your level of confidence in the above set of ratings.

Category 7. Synergy with [company] Development Strategy
1. There are no regulatory issues prohibiting the offering of this product/service.
2. Development of this type of product/service is typical of [company].
3. This product/service has been implemented by [company] on another platform.
4. The product/service could be implemented several different ways.

What is your level of confidence in the above set of ratings? Explain the reason(s) for your level of confidence in the above set of ratings.

Category 8. Service Novelty
1. This product/service is highly innovative.
2. This product/service will be totally new to the market.
3. This product/service relies on leading-edge technology.
4. This product/service is resistant to technological obsolescence resulting from technological advances.
5. The expertise AND technology required to develop this product/service are unavailable to our competitors in this market.

What is your level of confidence in the above set of ratings? Explain the reason(s) for your level of confidence in the above set of ratings.

Category 9. HF Resource Requirements
1. We have the necessary prototyping and testing equipments to develop the user interface for this product/service.
2. We have the necessary skills to develop the user interface for this product/service.
3. The time required to develop the user interface for this product/service is minimal.
4. The deadlines for developing the user interface for this product/service are determined internally to [company].
5. The information collection requirements for developing the user interface of this product/service involve a small work effort.

What is your level of confidence in the above set of ratings? Explain the reason(s) for your level of confidence in the above set of ratings.

Category 10. Usability Assessment
1. Design standards and guidelines exist for developing the user interface of this product/service.
2. The steps involved in using this product/service are uncomplicated.
3. The user interface for this product/service is uncomplicated.
4. Novices can use this product/service successfully.
5. Supporting research for this product/service exists in the industry or academic literature.

What is your level of confidence in the above set of ratings? Explain the reason(s) for your level of confidence in the above set of ratings.

Category 11. Productivity Enhancements
1. The product/service concept allows faster task completion.
2. The product/service concept reduces errors.
3. The product/service concept reduces training requirements.
4. The product/service concept automates some task.
5. The product/service concept increases user satisfaction.

What is your level of confidence in the above set of ratings? Explain the reason(s) for your level of confidence in the above set of ratings.

Category 12. User Interface Competitive Analysis
1. The user interface is new overall.
2. The user interface is new to the telecommunications industry.
3. The user interface can be generalized to fit or link with other products services.

4. There is competitive pressure to implement this user interface.

5. The user interface can be patented.

What is your level of confidence in the above set of ratings? Explain the reason(s) for your level of confidence in the above set of ratings.

Category 13. Opportunity

1. The potential market size in dollars for this product/service is very large.

2. The R&D monetary commitment is low.

3. There are few financial barriers to market entry for this product/service.

4. This product could be an early entrant into the marketplace. (If score is 4 or 5, skip #5)

5. This product provides incremental functionality to an existing product/service.

What is your level of confidence in the above set of ratings? Explain the reason(s) for your level of confidence in the above set of ratings.

Category 14. Time-to-Market

1. Trained resources are available internally or externally to get this product/service to market.

2. Development time will be short (3–6 months).

3. We can out source the development of this product/service.

4. Third party developers are necessary for deployment of this product/service.

What is your level of confidence in the above set of ratings? Explain the reason(s) for your level of confidence in the above set of ratings.

Category 15. Service Novelty

1. The product idea came to you from a customer, as opposed to an in-house lab or technical work (5=customer; 1=in-house).

2. This idea was-generated through a joint [company] customer program.

3. This idea was generated by a [company] person through direct contact with a customer.

4. A lead customer is sponsoring this product/service idea.

5. A customer is participating in the standardization of this idea through Bellcore or some other standards body.

What is your level of confidence in the above set of ratings? Explain the reason(s) for your level of confidence in the above set of ratings.

Category 16. Strategic Alignment

1. This product/service fits a customer strategy.

2. This product/service fits with an [company] initiative.

3. This product/service is of strategic importance to [company].

4. This product/service is in alignment with telecommunication industry trends.

5. The customers for this product are familiar with [company].

6. The competitors in this market are not new to [company].

What is your level of confidence in the above set of ratings? Explain the reason(s) for your level of confidence in the above set of ratings.

The sixteen Categories are logically separated into four categories each for marketing, technical, human factors, and business disciplines. Marketing includes Categories relating to end-user needs/trends, potential market, concept development, and competitive analysis. The technical factors include feasibility, skill resource availability, synergy with company development strategy, and product or service novelty. Human factors encompasses resource requirements, usability assessment, productivity enhancements, and user interface competitive analysis. Finally, the business discipline includes Categories relating to opportunity, time-to-market, service novelty, and strategic alignment. Each Category contains from four to six rating statements.

The software program also requires the IGs to provide a Confidence level for their ratings. A rating of "0" means "Not at all confident," and a rating of "10" means "Extremely confident." The Idea Evaluator needs to understand how confident the IGs were in providing their quantitative input to obtain a clearer picture of a particular innovation. For example, high qualitative scores coupled with low confidence levels suggest that the IG may be overly optimistic in allocating quantitative scores to this category and that more research by an expert in this area may be required for a more robust picture of the value of the idea with regard to the category in question.

In this phase, the software program also asks the IG for a rationale in assigning a particular confidence level to the quantitative scores. For example, the IG may be highly confident because he or she is an expert in the area or because he or she did research in the area. This type of qualitative response allows the Idea Evaluator to better assess the accuracy of the numeric confidence level.

4. Concept Assessment Phase

The Concept Assessment Phase gives the Idea Evaluator the opportunity to evaluate and approve or disapprove the new product or service idea. This phase presents summary information about the IG's idea as refined through the first three phases. Moreover, the Idea Evaluator can view the qualitative responses entered by the IG at previous phases.

Once the IG has completed the Concept Rating phase, the program compiles the resulting quantitative data and creates a graphical representation of the results in the form of generic evaluation model (GEM) charts. Samples of such graphs appear in FIG. 21 as a set of graphs that visually summarize the concept in the marketing, technical, human factors, and business disciplines captured in the Concept Rating phase. The ratings shown on these graphs are based on the ratings given by the IG in the Concept Rating phase. The Idea Evaluator may either view each of the four disciplines individually or all at once on one screen. The Idea Evaluator may also click on any of the axes in a graph to view the original ratings provided in the Concept Rating phase.

Developed by O'Driscoll et al. (1993), the generic evaluation model uses kite plots to display quantitative data to facilitate its interpretation. In this case, the quantitative data is displayed in four GEM charts (marketing 2101, technology 2102, human-factors 2103, and business 2104). Each GEM chart has, in turn, one category represented on one axis. For example, the marketing 2101 chart contains four axes corresponding to end-user needs/trends, potential market, concept development, and competitive analysis.

Meritorious ideas are represented by high ratings which, by the scoring algorithms discussed below, translate into increased distances between the origin and the points on the axes. Therefore, larger diamonds indicate stronger ideas in the discipline represented by the graph. An ideal idea would have relatively large diamond-shaped graphs in all four disciplines—marketing, business, technical, and human factors, as FIG. 1(a) shows. This graphical representation allows one to quickly scan these charts and verify by the shape of the diamond that all the scores from each category appear to be the same.

Figure 1B:
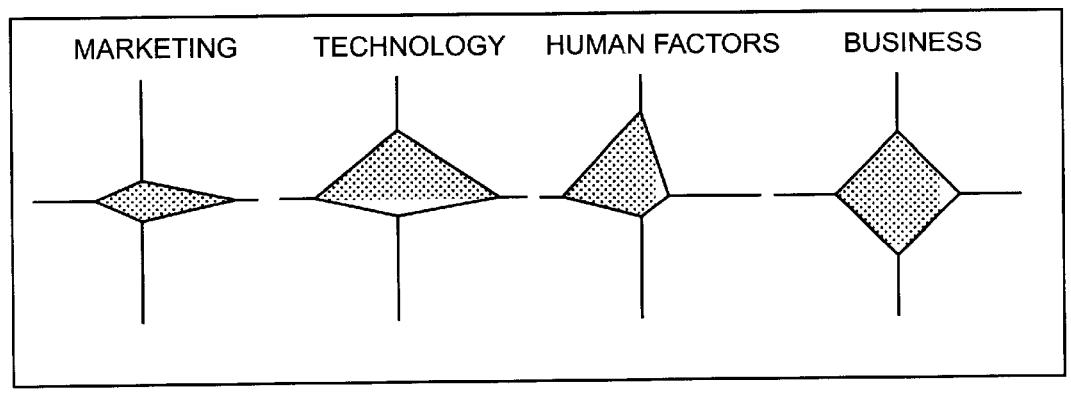

Such ideal outcomes, however, seldom arise. Consequently, Idea Evaluators must decide on less well developed and ideal ideas. For example, FIG. 1(b) shows graphs presenting a murkier picture. Taking the axes to correspond to those in FIG. 21, the graphs show a stable Business outlook, by virtue of the diamond shape, but a less appealing picture in the other areas. For example, Marketing appears weak in three areas, end-user needs/trends, concept development, and competitive analysis. Technology seems weak in one area, synergy with company development strategy, and Human Factors looks weak in two areas, usability assessment and productivity enhancement.

After examining the results, the Idea Evaluator can decide whether to order additional analysis before deciding whether to approve the new product or service idea. If the Idea Evaluator requires further analysis, the new product or service idea returns to the IG for further research. Otherwise, the Idea Evaluator decides whether to approve the idea based on available data. If approved, the idea may also be flagged for more comprehensive analysis. If the idea is not approved, the idea is stored and the Idea Development Process ends.

The scoring algorithm is tailored for two different types of statistical scores to mirror the two different types of decision making: conservative and non-conservative. The conservative score. uses the standard "street distance" statistical equation to total the quantitative scores as follows:

$$\Sigma\Sigma W_{ij} X_{ij}, \quad (1)$$

where $W_{ij}$ represents a weight that can be assigned to a category that may be of particular importance to a Idea Evaluator, and $X_{ij}$ represents the quantitative score assigned to a Category in the Concept Rating phase. The index i ranges from 1 to 4, representing each of the four GEM charts (marketing, business, human-factors, and technology). The index j also ranges from 1 to 4, representing each of the four categories assigned to each GEM chart. In the preferred embodiment, all categories are weighted equally.

This type of score rewards extremes in axis scores equally with averages and thus provides a more conservative scoring mechanism that favors diamond-shaped plots. Conservative managers who prefer to begin with a solid base in all dimensions and who like to work steadily towards improvement, thus growing the diamond, may favor this type of scoring.

Less conservative managers, on the other hand might, consider taking an educated risk on a non-diamond-shaped output, especially if they believe that they may have some control over improving the current low score on the GEM chart. Such managers might prefer a "Euclidian distance" statistical equation to total the quantitative scores as follows:

$$\sqrt{[\Sigma\Sigma(WijXij)^2]}. \quad (2)$$

Preferably, both scores are provided for each idea above the GEM diagram for the idea. The average confidence level (out of 100%) is also provided to demonstrate the IG's confidence level with their quantitative responses in the Concept Rating phase. This average is computed as a straight numeric mean of the confidence levels entered in the Concept Rating phase, then expressed as a percentage.

Once Idea Evaluators become familiar with the concept of the Generic Evaluation Model, they may wish to know why a particular category scored low, specifically which questions scored low in the set of questions that define that category. The preferred embodiment allows the Idea Evaluator to access this information. The software program allows Idea Evaluators to find out which questions scored low in any of the categories they wish to explore. In fact, all of the data that the IG input into the system can be accessed by the Idea Evaluator. This allows for speedier decision making because the Idea Evaluator can herself explore the weaknesses in particular categories and determine, for example, that low scores actually represent the IG's lack of knowledge in that discipline.

In the Concept Assessment Phase, as well as in the Concept Development and Concept Rating phases, the program preferably provides the IG with hyperlinks back to any questions previously answered in the Idea Development Process that pertain to a current topic. Innovation activities are rarely considered full time jobs, so IGs will likely be working on their ideas sporadically. Providing hyperlinks to previous cues allows the IG to build on the idea continuously.

C. Implementation

1. System configuration

Figure 2:
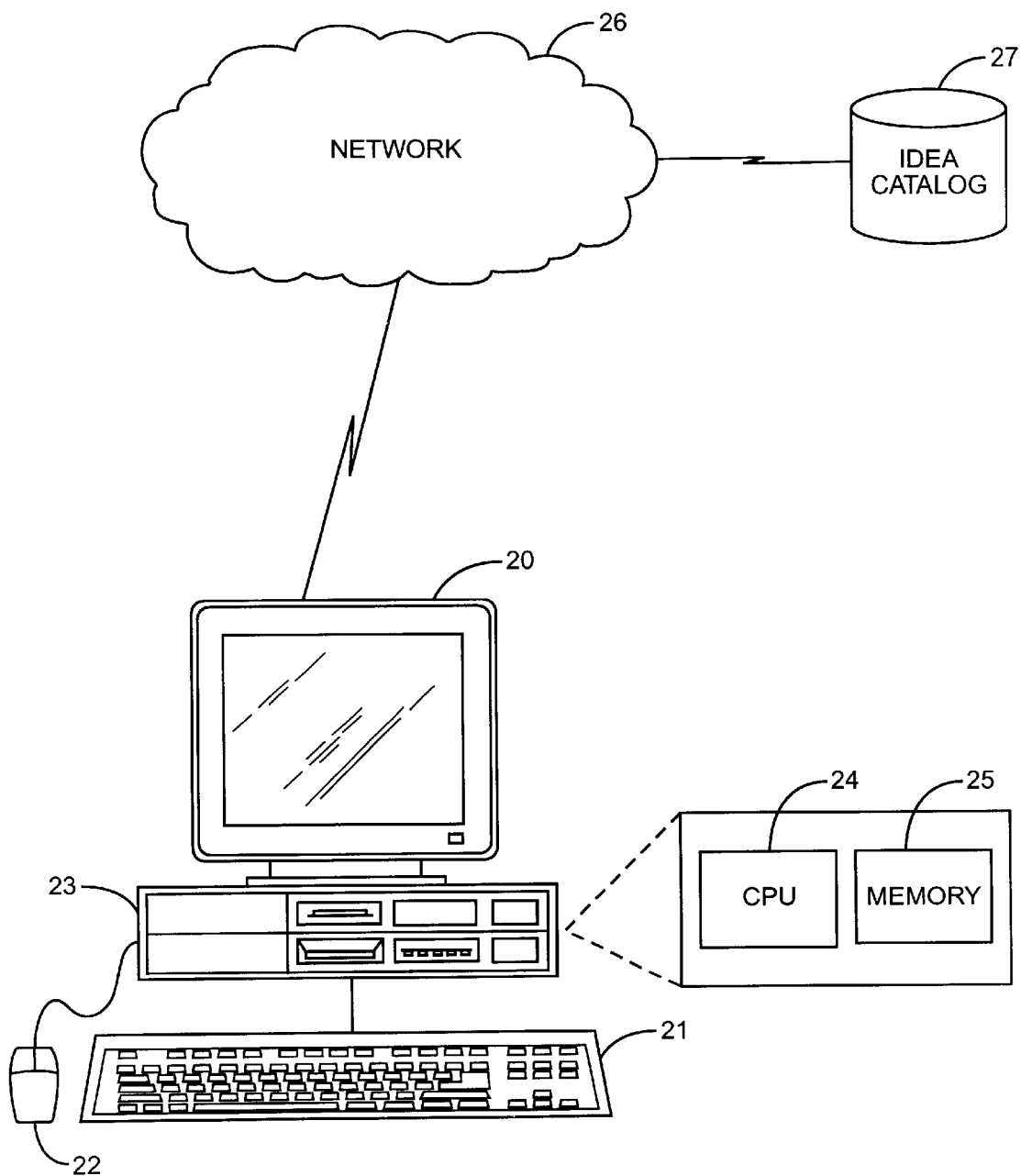
FIG. 2 is a diagram showing a computer system for running the software implementation of the present invention.

FIG. 2 is a diagram of a system that can be used to carry out the Idea Development Process. Monitor 20 provides the principal display interface with the IG, and keyboard 21 and mouse 22 allow the IG to provide inputs to system a processing unit 23. Processing unit 23 also includes a CPU 24 and memory 25 containing programs and data. In the preferred embodiment, processing unit 23 is connected to a network 26 of other computers, and information collected about ideas is centrally stored in a database 27 (Idea Catalog).

The Idea Development Process can be implemented in software as a Supercard project running on a Macintosh. The Supercard project consists of a number of windows, each window consisting of a number of cards. The major windows and cards and their functions are listed in Appendix A. The major global variables and their definitions can be found in Appendix B.

Figure 3:
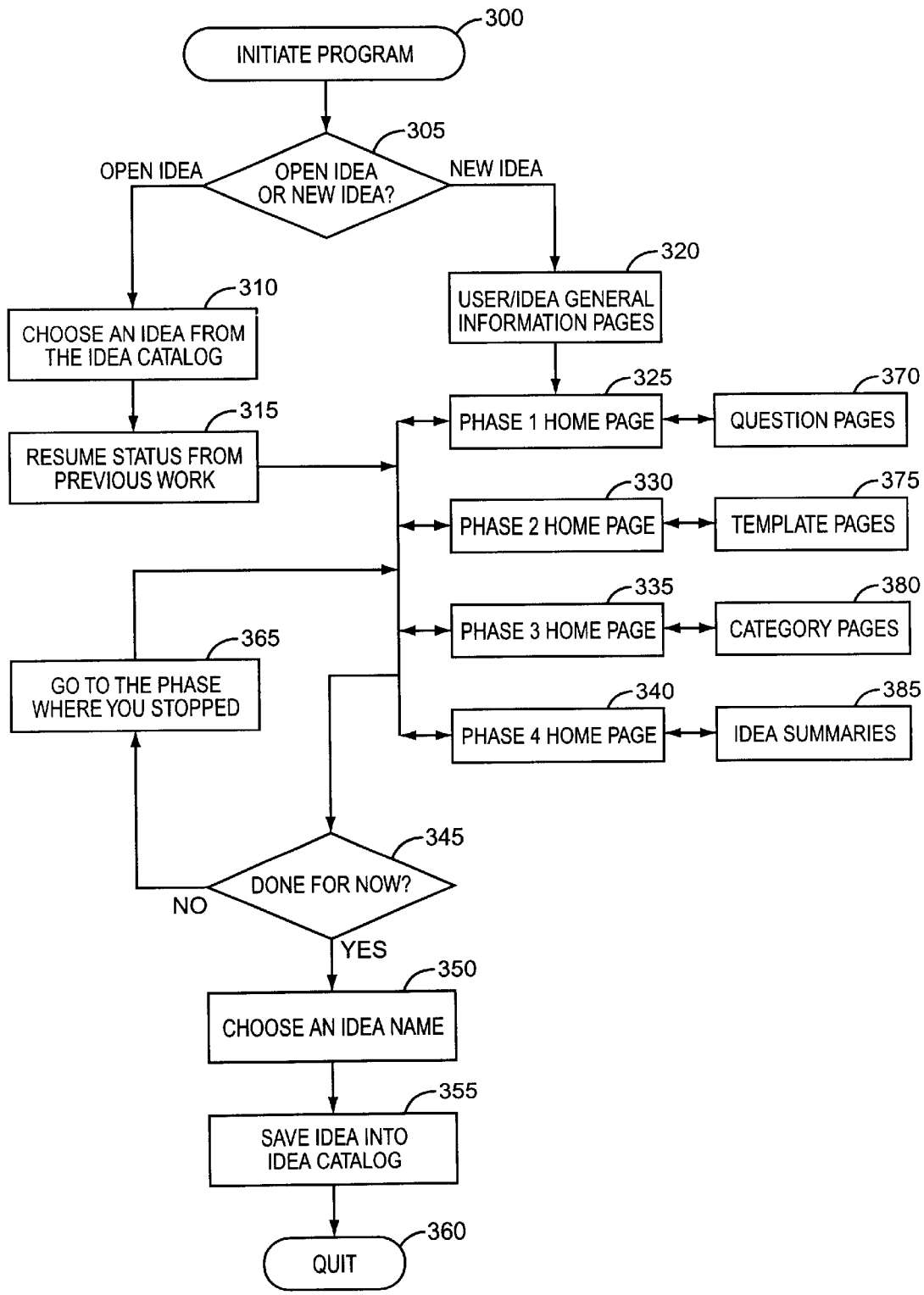
FIG. 3 is a generalized flowchart showing the logical steps of the software implementation.

FIG. 3 is a flowchart showing the preferred steps to implement this invention. After the program is started (step 300), the software asks whether the idea is new or existing (step; 305). If the idea exists, the system first loads the idea from the Idea Catalog (step 310) and places the IG in the phase last worked on (step 315). If the idea is new, the program presents the IG with a general information page (step 320), shown in FIG. 4, before proceeding with the Idea Qualification phase (step 325) and subsequent phases, as discussed below.

Figure 5:
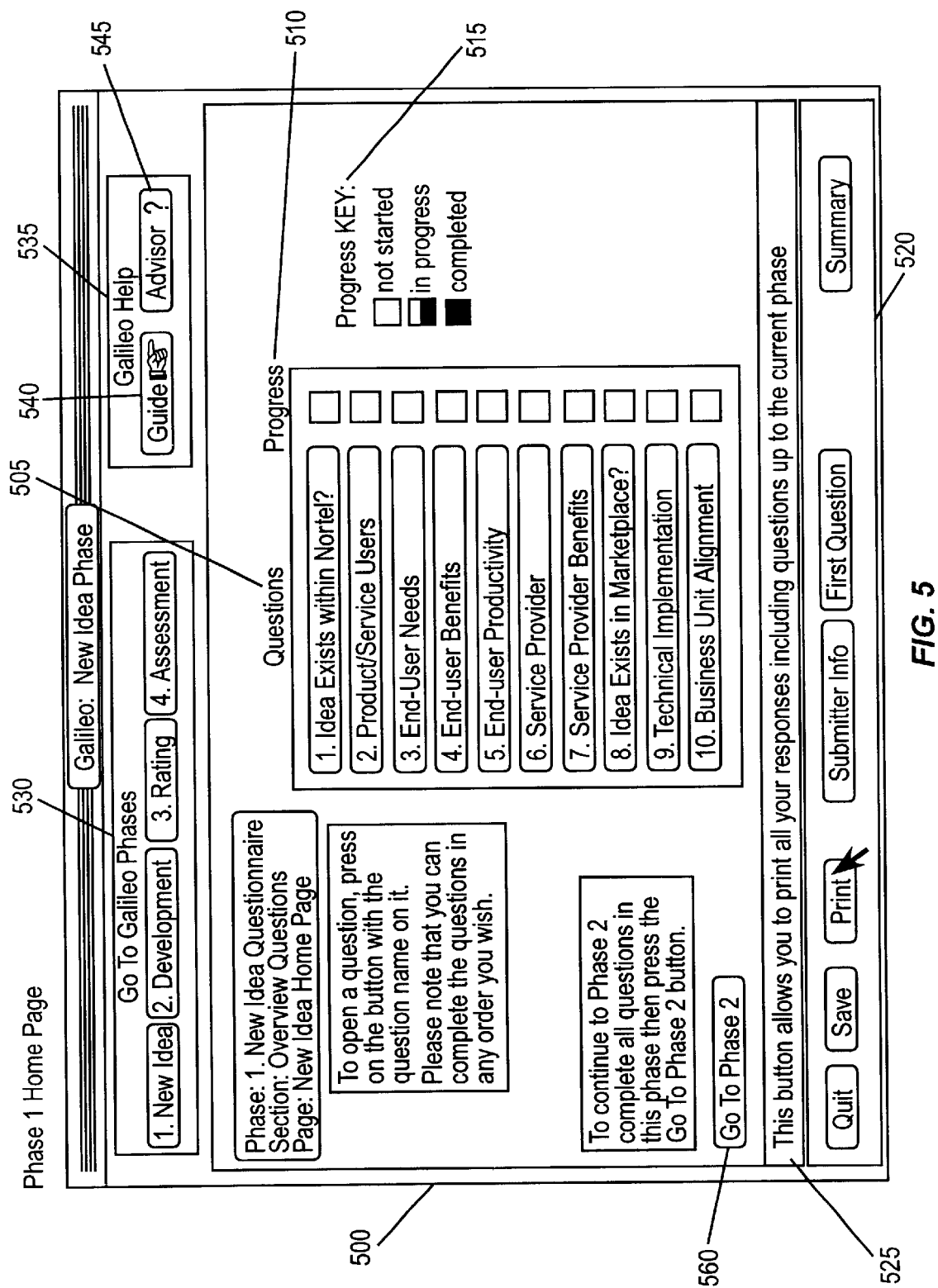
FIG. 5 is a screen shot of the Idea Qualification Home Page.

The first page displayed by the software program for each of the four phases is called a "Home Page." FIG. 5 shows the Home Page 500 for the Idea Qualification phase. The ten questions 505 forming the core of this phase are presented to the IG along with progress indicators 510 which indicate the degree to which each of the questions has been completed. As indicated by the progress key 515, each question has either not been started, is in progress, or has been completed. The buttons 520 at the bottom of the screen allow the IG to quit the program, save the work completed on the idea, print the idea, return to the general information page (FIG. 4), proceed with answering the first question, or obtain a summary of questions and answers provided to that point. A sample summary page is shown in FIG. 6. Note that the questions are listed from lowest rating to highest rating, indicating to the IG which questions need more attention.

Returning to the Idea Qualification phase Home Page, the Help Line 525 provides information on how to use the program. Located near the bottom of every page, the Help Line 525 displays a brief description of the object (e.g., a button) on which the IG's mouse arrow is positioned. For example, in FIG. E, the mouse arrow is on the "Print" button, and the Help Line 525 provides a description of that button's function.

In the upper left corner of screen 500, the Go To Phase box 530 lists the four phases of the Idea Development Process and highlights the phase that the IG is currently viewing. If the IG had completed questions 505 of the first phase, the IG could proceed to other phases by clicking on the appropriate buttons.

Figure 7:
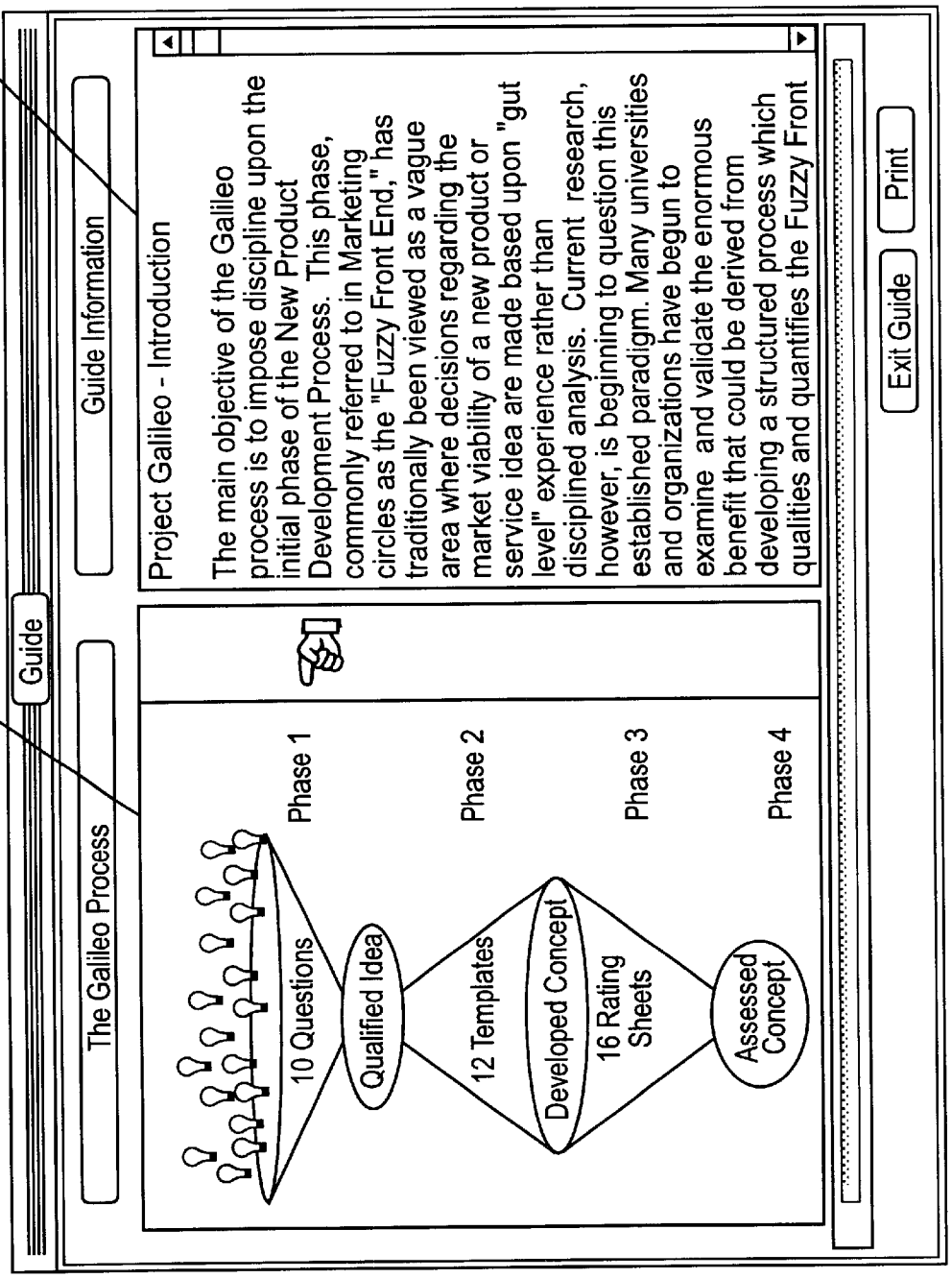
FIG. 7 is a screen shot of a Guide Information Page for the Idea Qualification phase.

A Help box 535 located in the upper right corner of every screen provides access to several levels of help. Clicking on Guide button 540 takes the IG to a help page, an example of which is shown in FIG. 7. The Guide assists the IG in navigating through the various phases of the Idea Development Process. The Guide reminds the IGs where they are in the overall Idea Development Process 705 and assists them in moving through this process as expediently as possible by providing information introducing the IG to the Idea Development Process 710.

Figure 8:
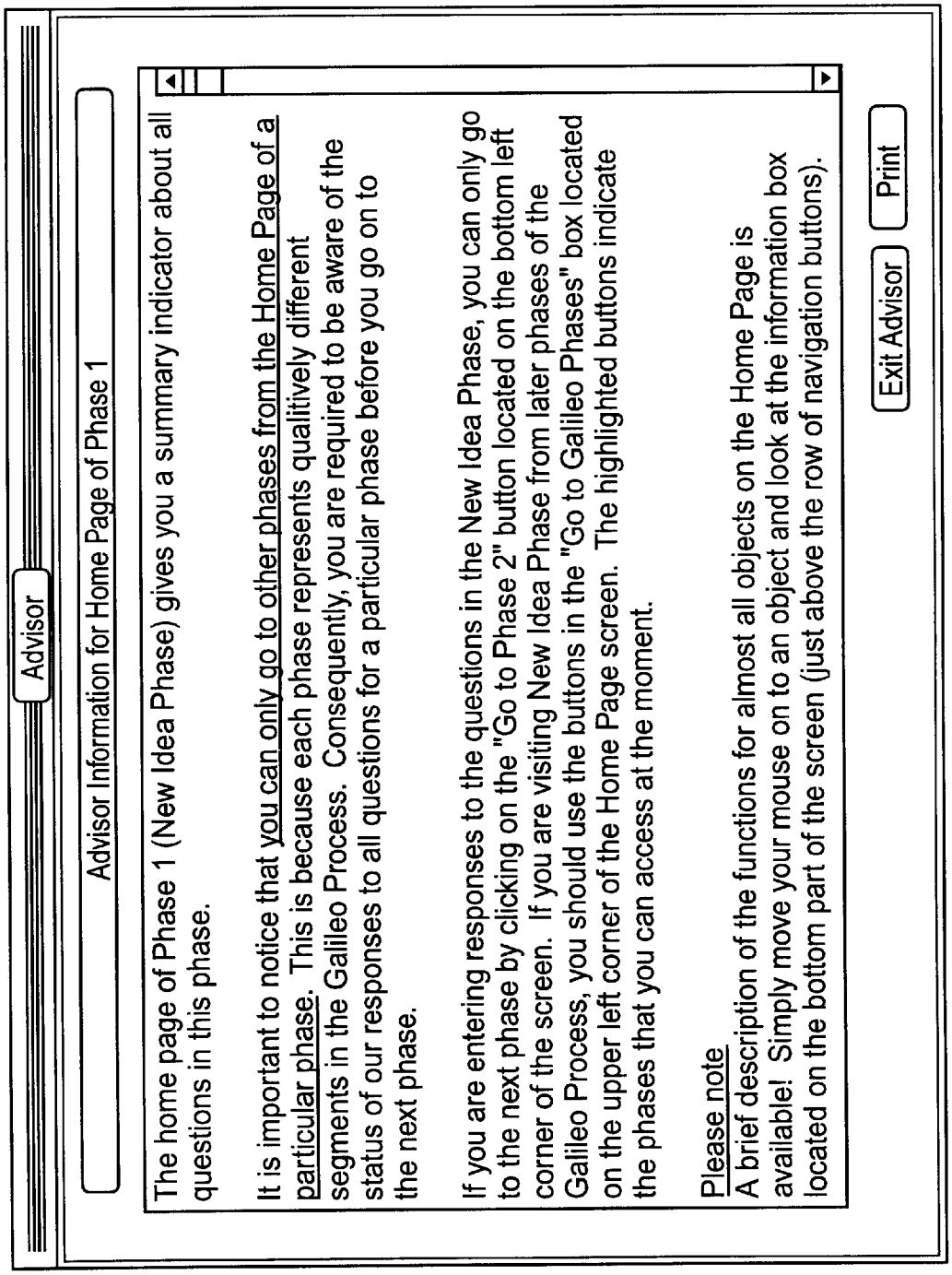
FIG. 8 is a screen shot of an Advisor Information Page for the Idea Qualification phase.

Clicking on Advisor button 545 in Help box 535 takes the IG to a separate help page, FIG. 8. The Advisor provides IGs with context specific information to assist them in performing the task or activity required by the Idea Development Process. For the inexperienced IG, the Advisor could provide a list of suggested periodicals or market research reports related to a specific question that they are having trouble with. The Advisor could also provide information on the various questions, statements, or terminology used by the program.

Figure 9:
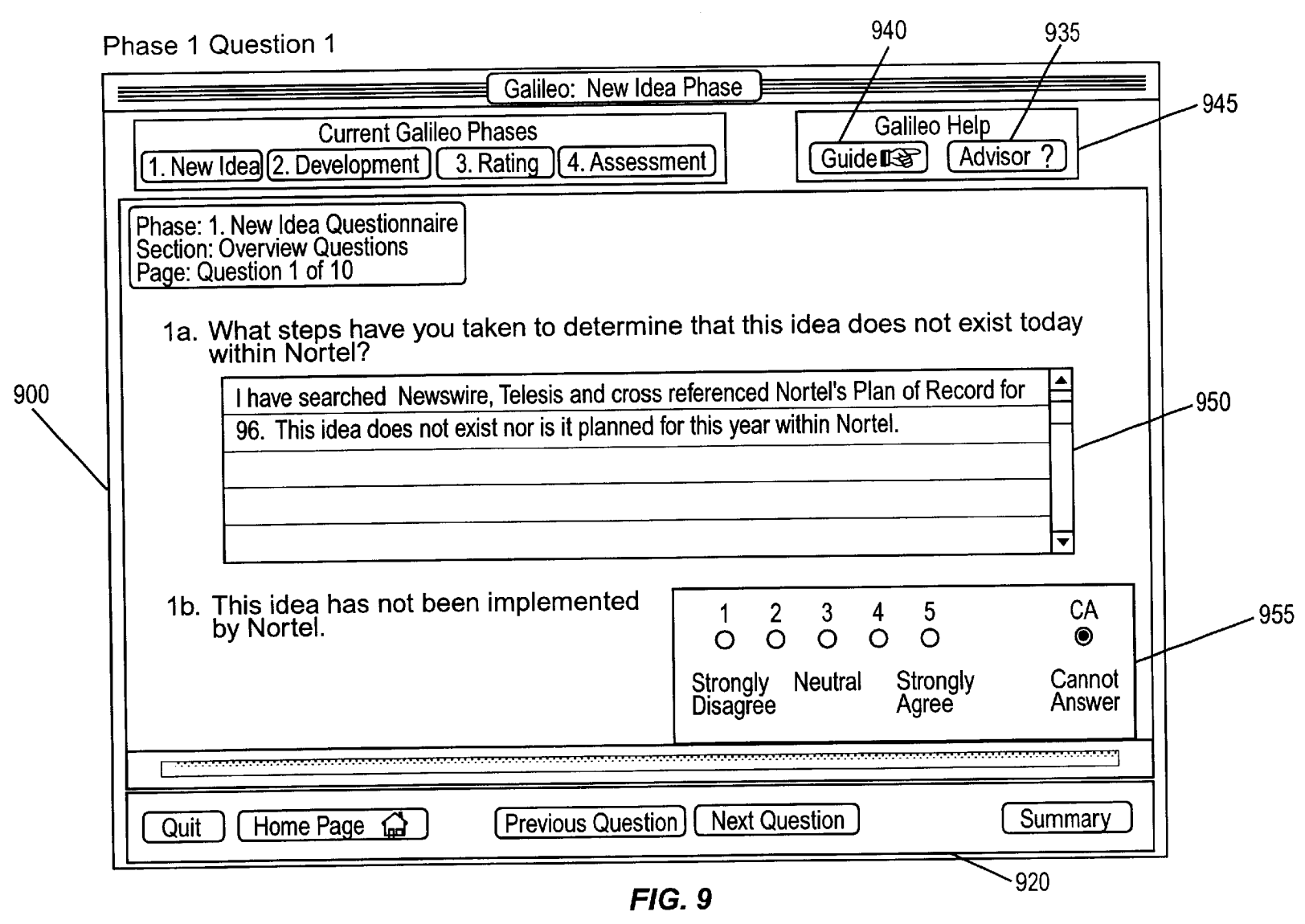

The IG may proceed to answer any of the ten questions 505 in the Idea Qualification phase by clicking on them. FIG. 9 shows the page 900 (step 370 in FIG. 3) for question 1, including a box 950 for a qualitative answer to the question and an area 955 for quantitatively rating the answer. The buttons 920 on the bottom of the screen allow the IG to quit the program, return to the Idea Qualification Home Page 500, move between questions, or obtain a summary of questions that have already been answered as shown in FIG. 6.

Clicking on Guide help button 940, in Help box 935 takes the IG to the help screen shown in FIG. 7. Clicking on Advisor button, 945 in box 935 takes the IG to the help screen shown in FIG. 10 where the program provides information about the particular question.

Proceeding from one phase to the next is permitted once all questions in a particular phase have been completed. Accessing the next phase is accomplished using the button located near the bottom left of the Home Page. As shown in FIG. 5, button 560 is labeled with the appropriate phase number.

Figure 11:
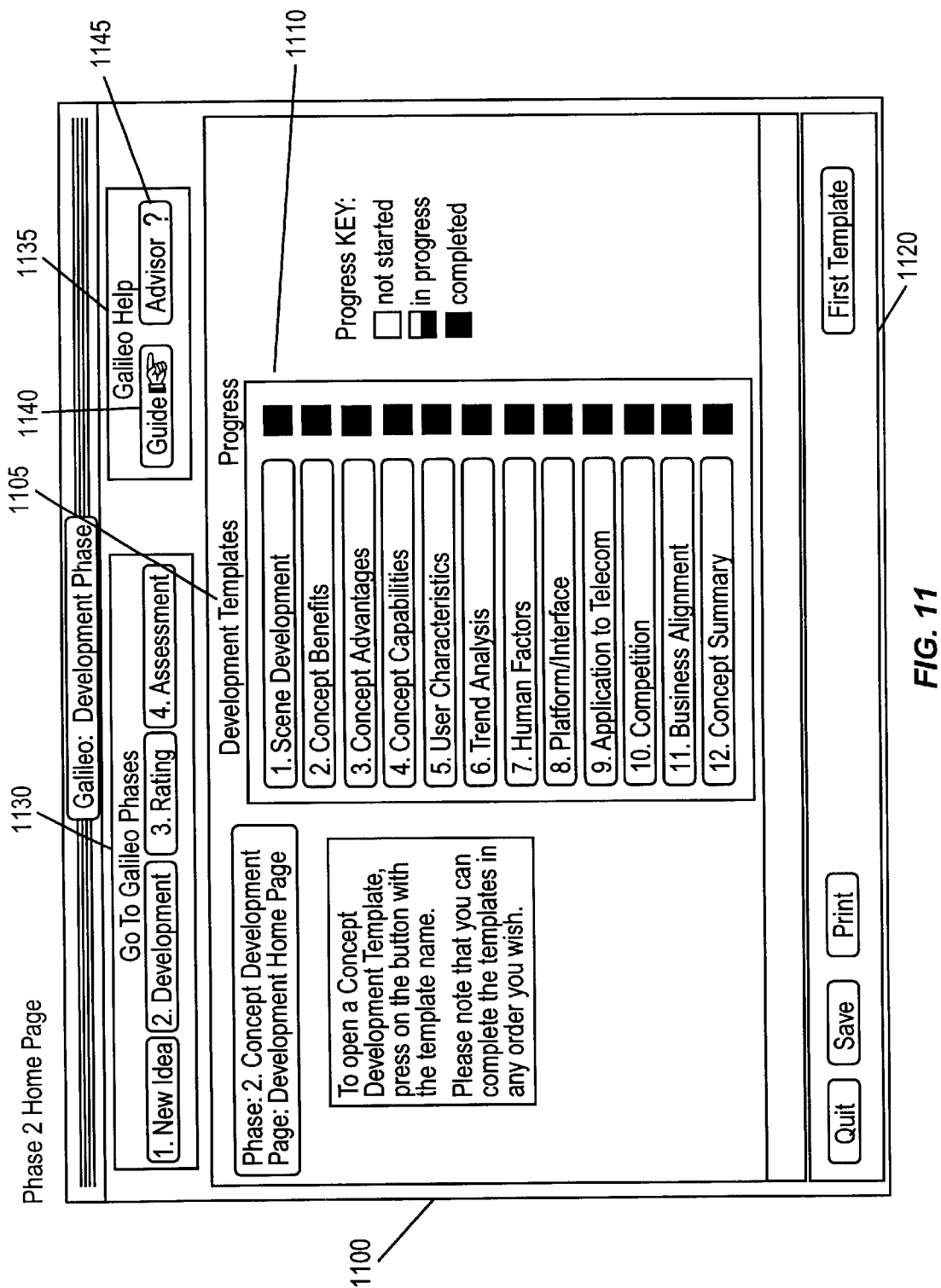
FIG. 11 is a screen shot of the Concept Development phase Home Page.
Figure 12:
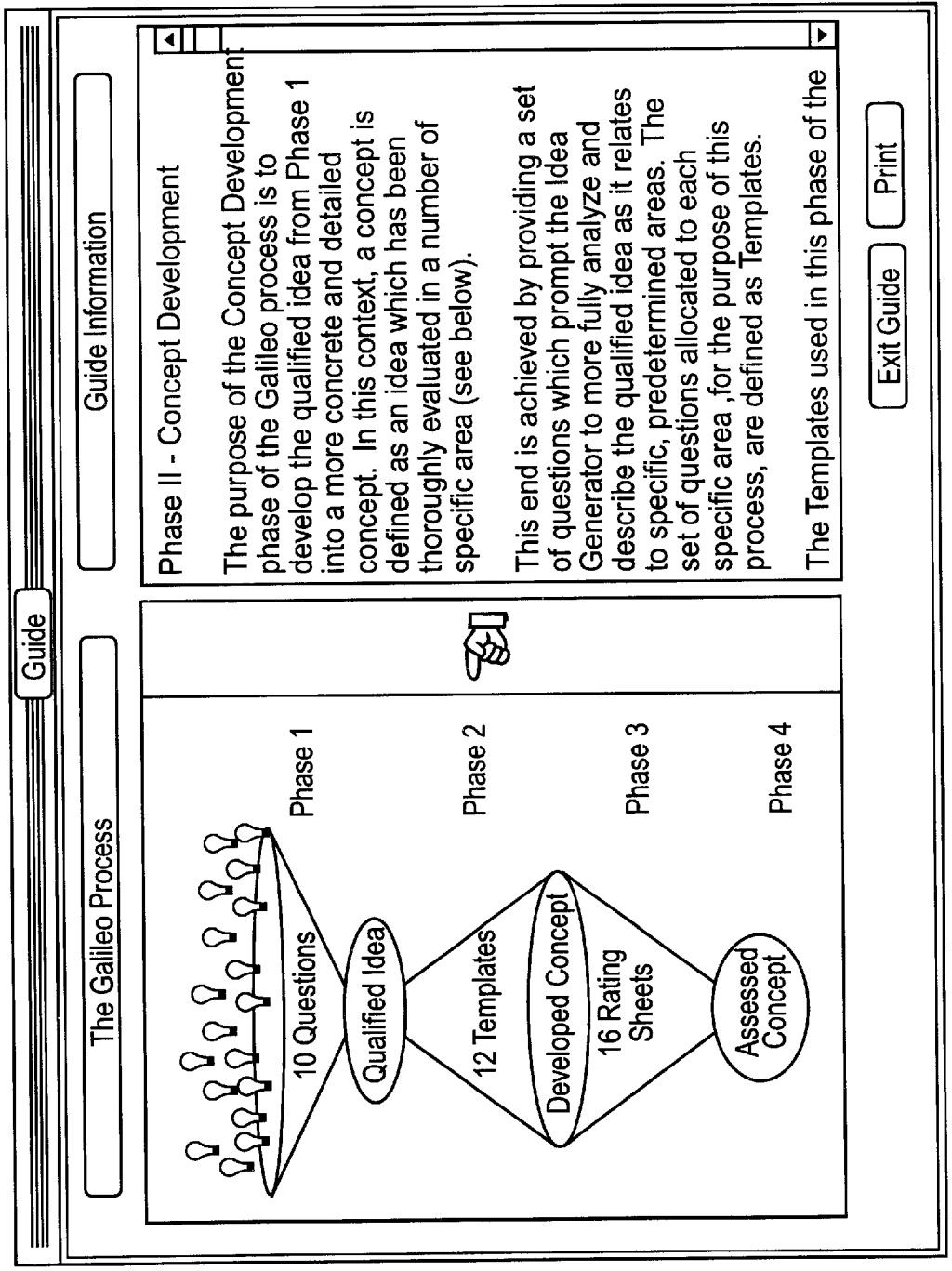
FIG. 12 is a screen shot of a Guide Information Page for the Concept Development phase.

The preferred Home Page for the Concept Development page (step 330 of FIG. 3) is shown in FIG. 11. Home Page 1100 shows the twelve Templates 1105 and their associated progress indicators 1110. The buttons 1120 at the bottom of the screen 1100 allow the IG to quit the program, save and print the idea information, or proceed with responding to the first Template. Clicking on Guide button 1140 in Help box 1135 takes the IG to the help screen shown in FIG. 12. Clicking on Advisor button 1145 takes the IG to a help screen of the same basic format as the one shown in FIG. 8. Navigation through the phases is provided in the upper left corner by the Go To Phases box 1130. The IG may enter the Template pages by clicking on any one of the twelve Templates 1105.

Figure 13:
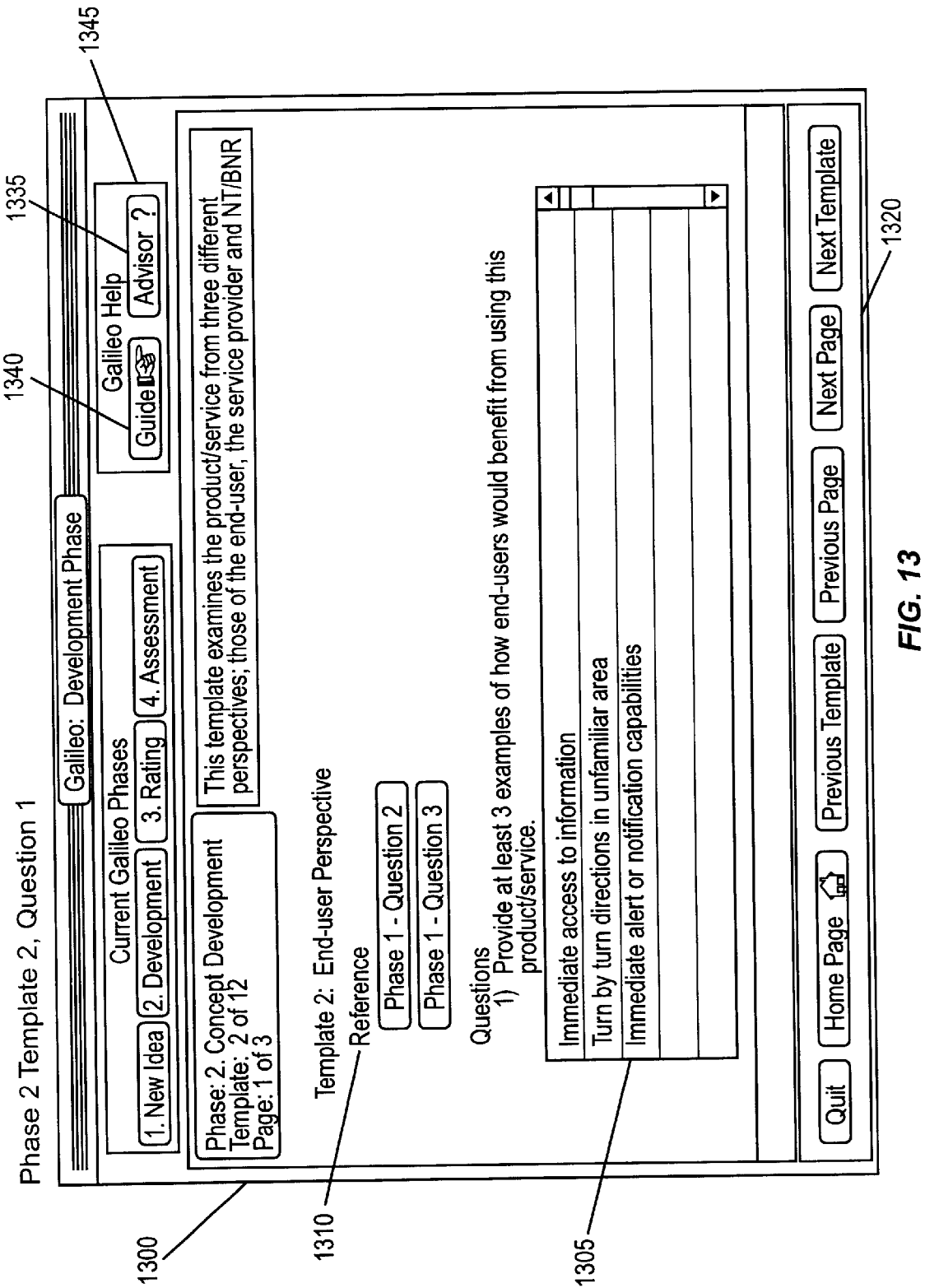
FIG. 13 is a screen shot of a Template Page for the Concept Development phase.

FIG. 13 shows a screen 1300 (step 375 in FIG. 3) associated with Template 2, question 1. The buttons 1320 at the bottom of the screen allow the IG to quit the program, return to the Concept Development phase Home Page 1100, and move between Templates and pages within Templates. Screen 1300 includes a Questions section 1305 for providing qualitative answers, and a Reference section 1310 providing hyperlinks back to related questions from the Idea Qualification phase. Clicking on Guide button 1340 in Help box 1335 takes the IG to the help screen shown in FIG. 12. Clicking on Advisor button 1345 takes the IG to the help screen shown in FIG. 14.

Figure 15:
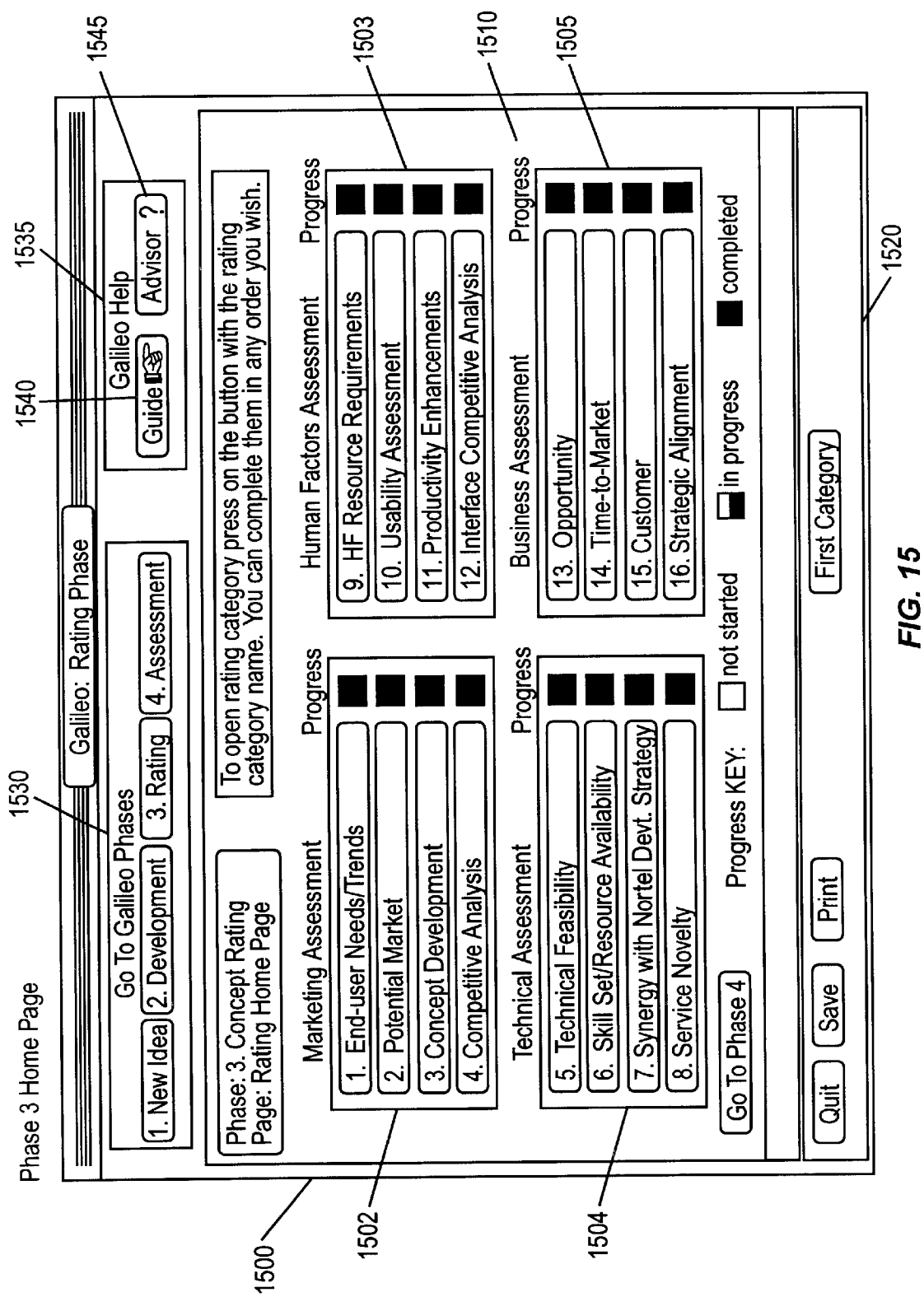
FIG. 15 is a screen shot of the Concept Rating Home Page.
Figure 16:
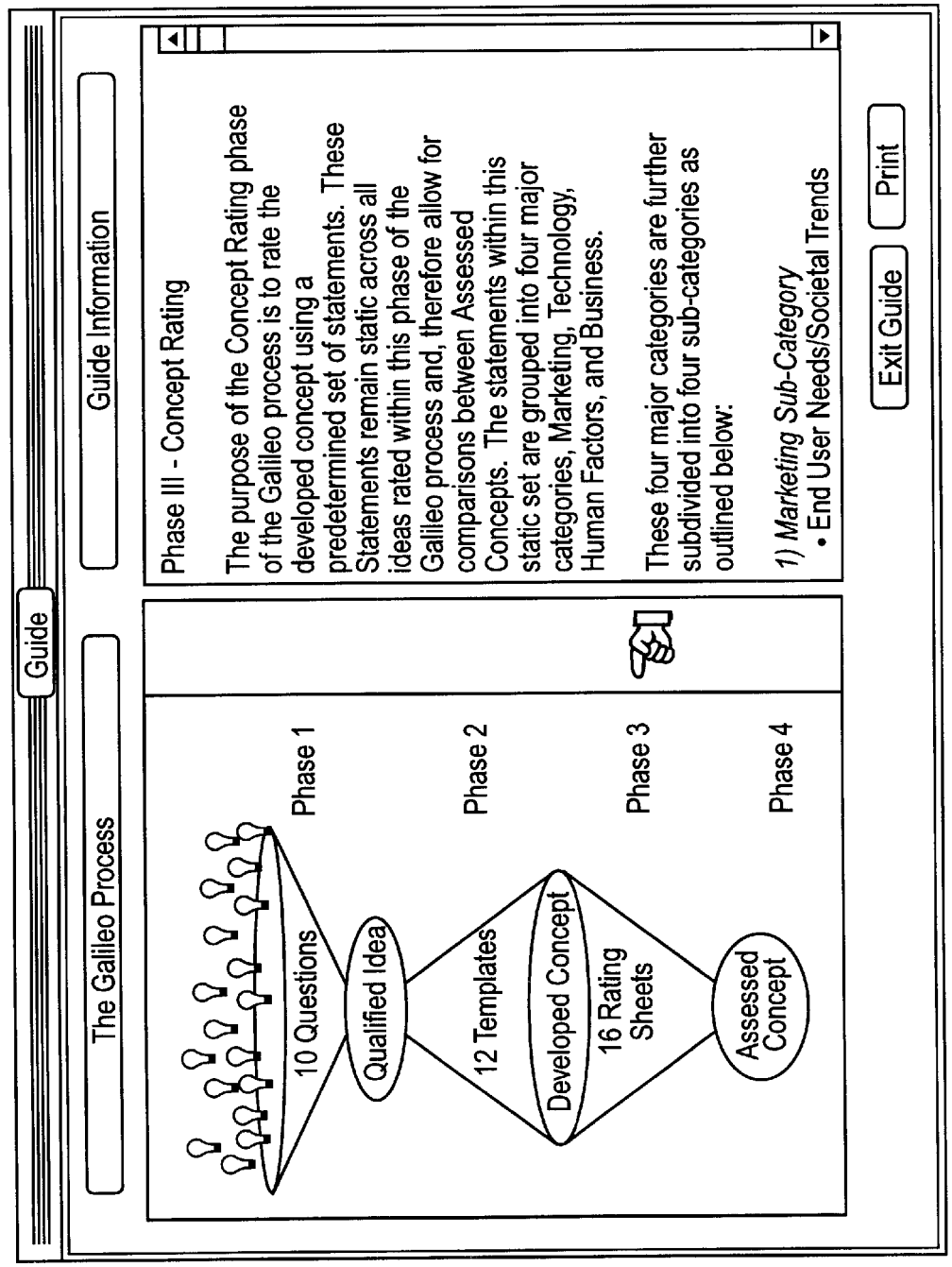
FIG. 16 is a screen shot of an Guide Information Page for the Concept Rating phase.
Figure 17:
FIG. 17 is a screen shot of a Category Page for the Concept Rating phase.
Figure 19:
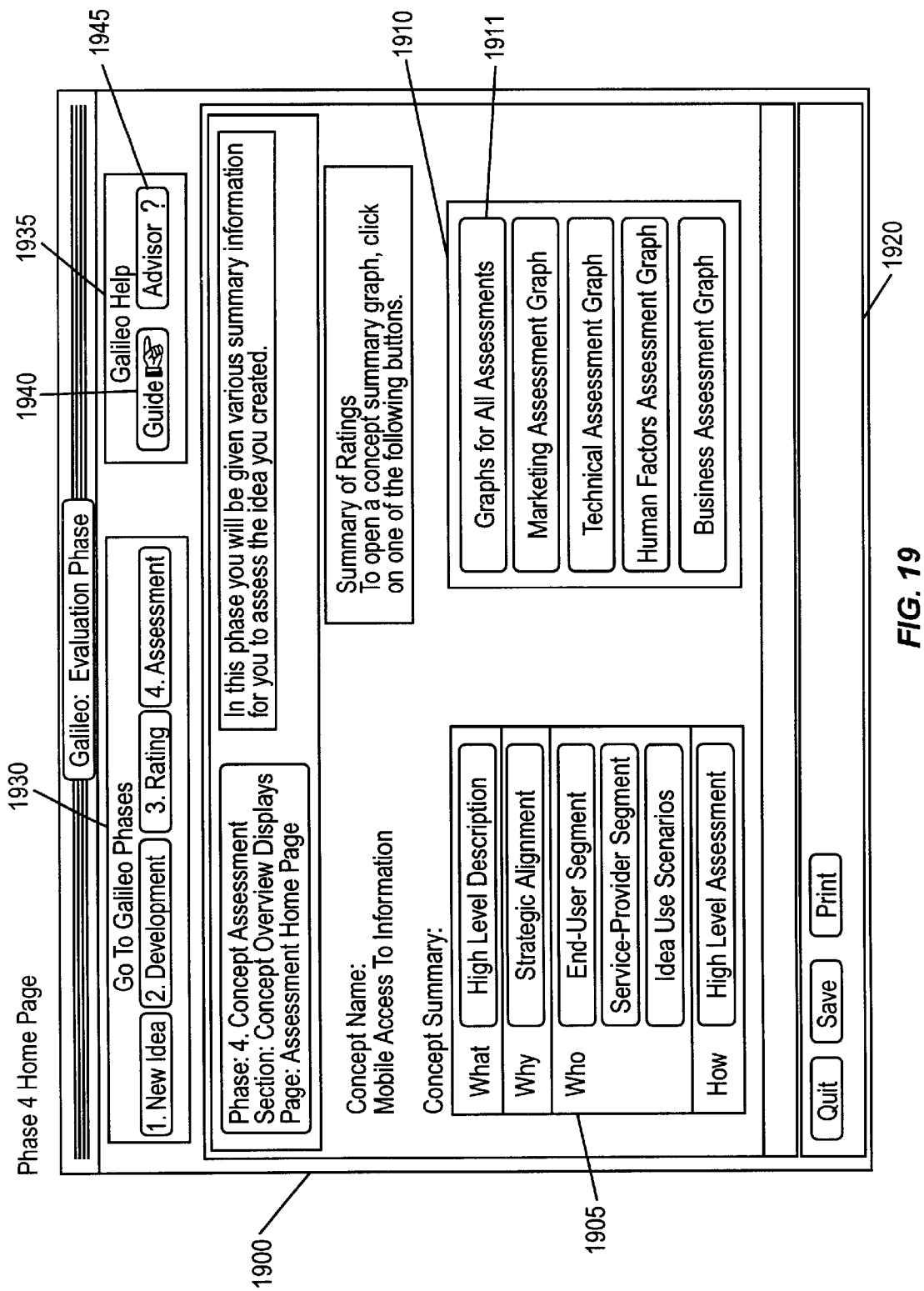
FIG. 19 is a screen shot of the Concept Assessment phase Home Page.

FIG. 15 shows the preferred Home Page 1500 for the Concept Rating phase (step 335 of FIG. 3) of the Idea Development Process. The sixteen Categories of questions are divided into four subsets: Marketing Analysis 1502, Human Factors Assessment 1503, Technical Assessment 1504, and Business Assessment 1505. Each listed Category has an associated progress indicator 1510. The buttons 1520 at the bottom of the screen allow the IG to quit the program, save or print the idea information, or proceed with answering the questions in the first Category. The Go To Phases box 1530 in the upper left portion of the screen 1500 allows the IG to move between phases. Clicking on Guide button 1540 in Help box 1535 takes the IG to the help screen shown in FIG. 16, while clicking on Advisor button 1545 takes the IG to a help screen having the same basic format as the one shown in FIG. 8.

The IG may answer the questions in the Categories by clicking on a particular Category in page 1500. Selecting Category 1, for example, brings up the screen 1700 (step 380 in FIG. 3). The screen 1700 has an area 1750 in which the IG selects a level of agreement with a particular statement, an area 1755 for entering a confidence level in the ratings, and an area 1760 for entering, a qualitative explanation of the given confidence level.

Buttons 1720 at the bottom of the screen allow the IG to quit the program, return to the Concept Rating phase Home Page 1500, and move between Categories. Clicking on Guide button 1740 in Help box 1735 takes the IG to the help screen shown in FIG. 16. Clicking on Advisor button 1745 takes the IG to the help screen shown in FIG. 18.

When the IG has completed the Idea Qualification, Concept Development, and Concept Rating phases, the IG's role is complete, so the IG quits the program (step 345 in FIG. 3) and saves the idea into an idea catalog (steps 350 and 355). When the Idea Evaluator starts a program session (step 305) and chooses an idea (step 310), the program loads the selected idea from the Idea Catalog (step 315) and proceeds with the Concept Assessment phase (step 340).

Figure 20:
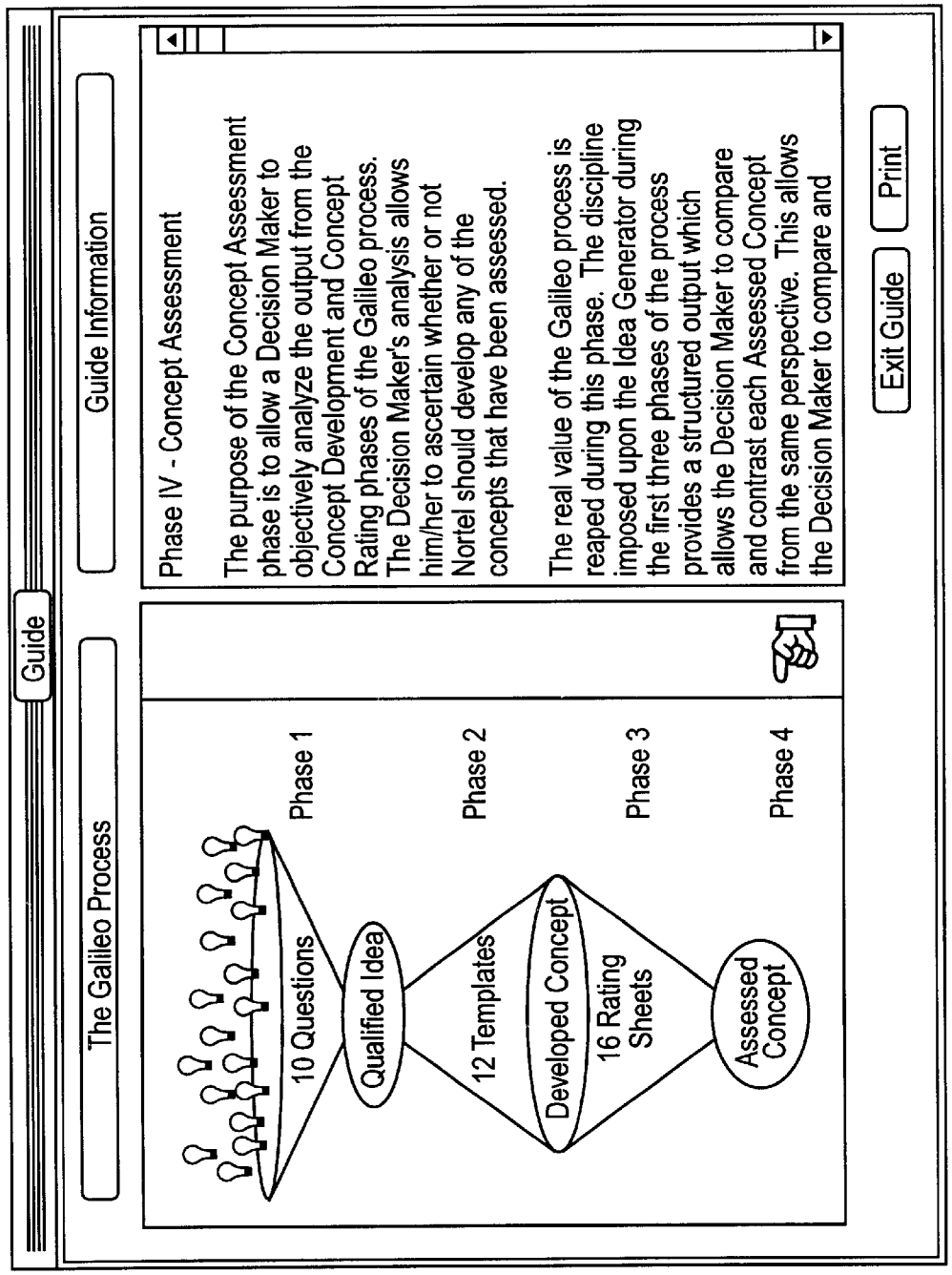
FIG. 20 is a screen shot of a Guide Information Page for the Concept Assessment phase.

The Concept Assessment phase Home Page 1900 in FIG. K provides access to summary information 1905 concerning the idea and access to GEM charts 1910 generated from the ratings given by the IG in the Concept Rating phase. Buttons 1920 at the bottom of the screen allow the Idea Evaluator to quit the program and save or print the idea information. Buttons in the Go To Phase box 1930 allow the Idea Evaluator to move between the phases of the Idea Development Process. Clicking on Guide button 1940 in Help box 1935 takes the Idea Evaluator to the help screen shown in FIG. 20. Clicking on Advisor button 1945 takes the Idea Evaluator to a help screen having the same basic format as the one shown in FIG. 8.

Figure 21:
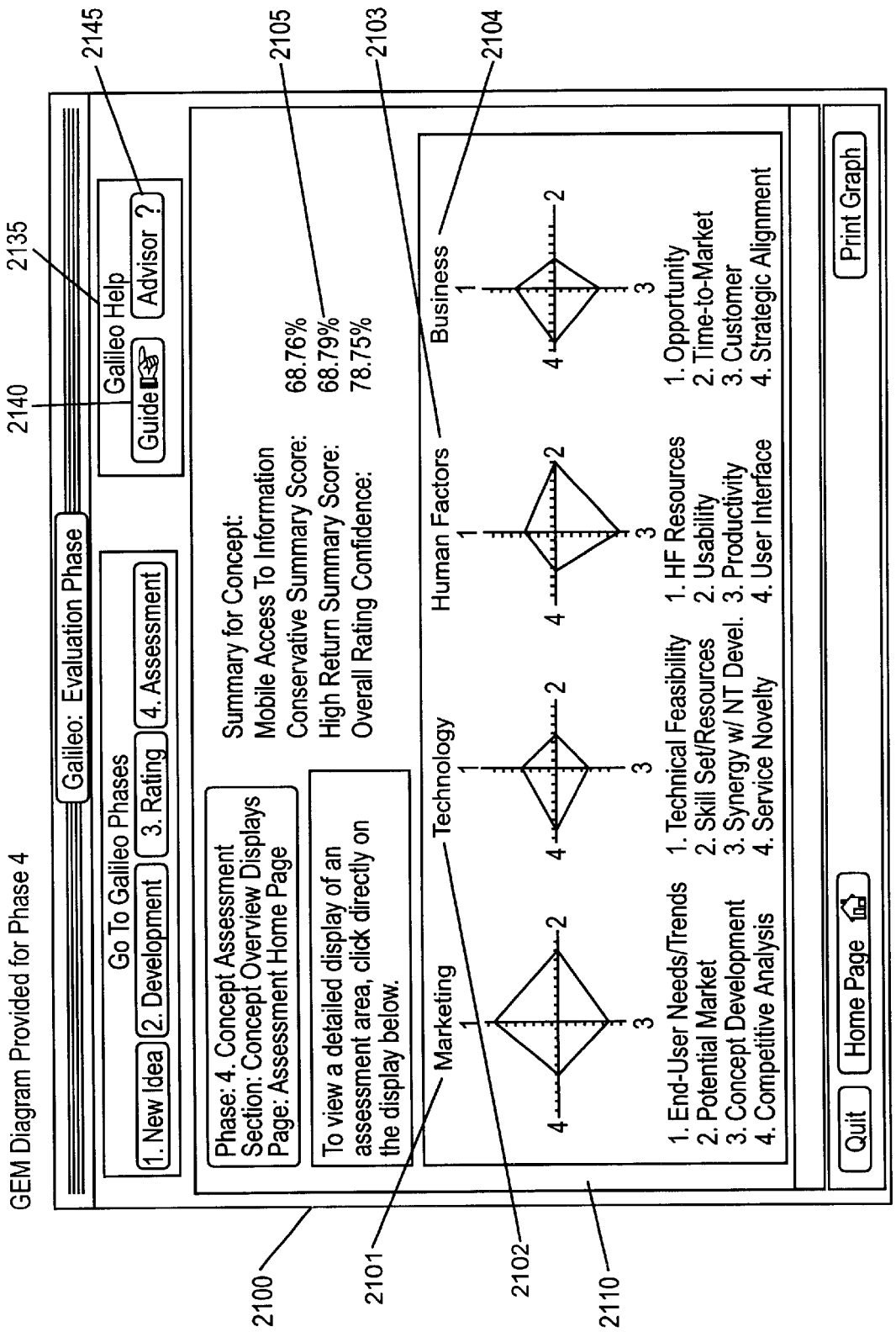
FIG. 21 is a GEM Diagram Page for the Concept Assessment phase.
Figure 22:
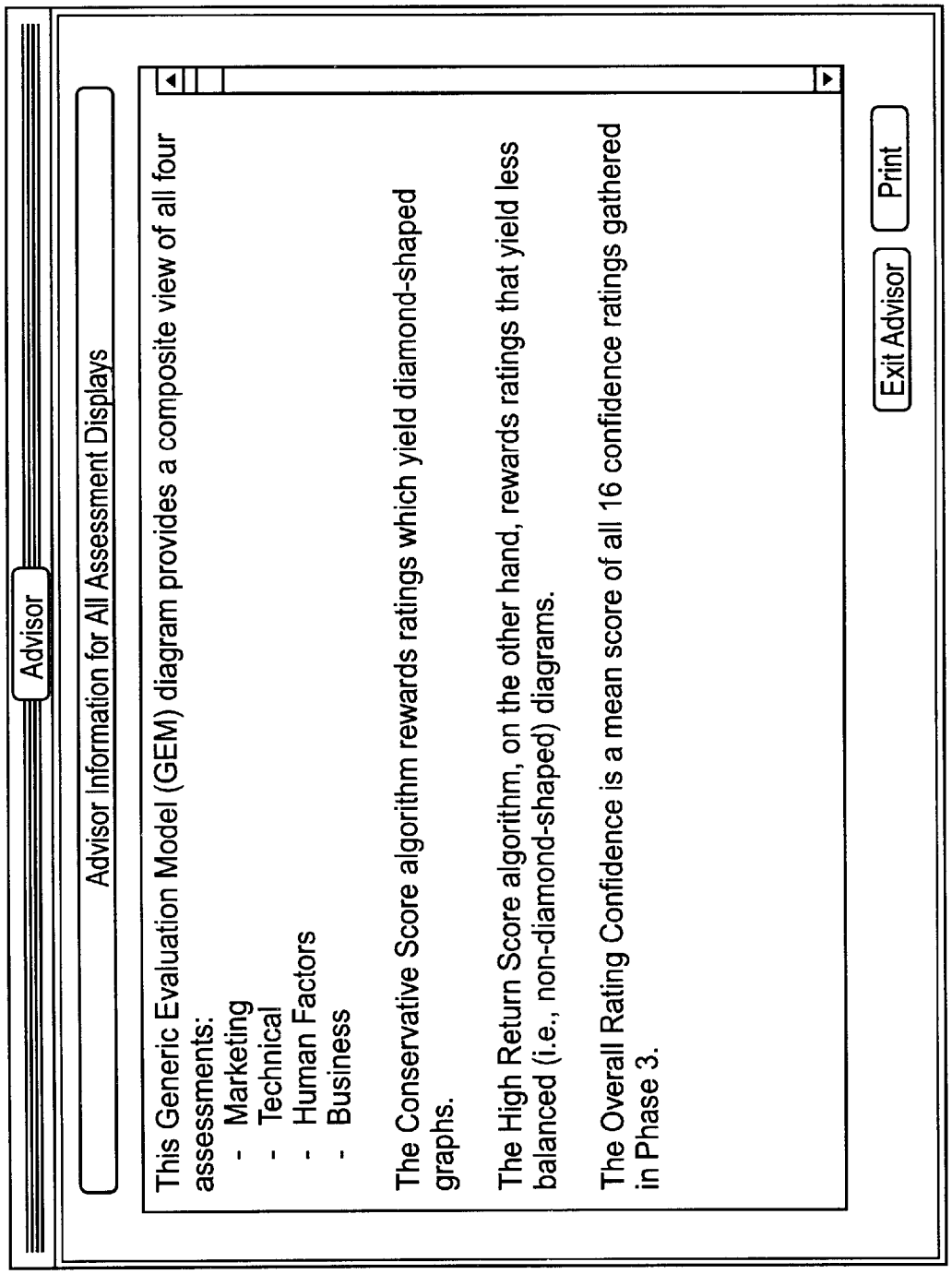
FIG. 22 is an Advisor Information Page for the GEM Diagram Page.

The Idea Evaluator may view the GEM charts (step 385 in FIG. 3) by clicking on the Graphs for All Assessments button 1911. FIG. 21 shows a typical chart page 2100 with an area 2105 for providing a Conservative Summary Score, a High Return Score, and an Overall Rating Confidence expressed as percentages. The central part of screen 2100 shows the four GEM charts 2110 with the associated four Categories listed under each. From the GEM Chart screen 2100, clicking on Guide button 2140 in Help Box 2135 takes the Idea Evaluator to the help screen shown in FIG. 20. Clicking on Advisor button 2145 takes the Idea Evaluator to the separate help screen shown in FIG. 22.

Returning to FIG. 3, when the IG or Idea Evaluator wishes to exit, the program asks if the IG or Idea Evaluator is done (step 345), asks for an idea name (step 350), and saves the idea in the Idea Catalog (step 355) before quitting (step 360). If the IG or Idea Evaluator indicates that they are not done, the program returns them to the phase they were working on (step 365).

CONCLUSION

The Idea Development Process aids IGs in developing new product or service ideas into robust concepts, asking a series of qualitative questions that force the Idea Generator to further consider and research the idea, followed by a series of quantitative questions that give the Idea Generator the opportunity to rate the idea. Only when these ratings are complete does the Idea Evaluator become involved. Whereas in the past, a multi-functional team was required to fully develop an idea, the Idea Development Process allows one individual to transform his or her new product or service idea into a form suitable for evaluation.

It will be apparent to those skilled in the art that various modifications and variations can be made in the methods and apparatus of this invention without departing from the scope or spirit of, the invention. For example, the Idea Catalog can act as a central repository for all new ideas within a company allowing many individuals to contribute to the idea development process, or providing an overall picture of the company's new idea efforts. Also, the process can use different questions tailored to the needs of a particular enterprise. Other embodiments of the invention will be apparent to those skilled in the art from consideration of the specification and practice of the invention.

The specification and examples should be considered as exemplary. The true scope and spirit of the invention are determined by the following claims.

APPENDIX A

| SC Window names: _<br>SC Card names: | Window Function: _<br>Card Function: |
|---|---|
| Hidden Window | Supercard requires that at least 1 window be open at all time _ |
| hidden card | Supercard requires all windows to have at least 1 card |
| New Idea Phase | Contains all cards for Phase _ |
| Splash Screen | Presents opening graphic screen |
| Password | Asks user if they have a password |
| OpenOrNew | Asks user to OPEN idea or start NEW idea |
| IG info | Collects information about Idea Submitter |
| IG info1 | Collects information about Idea Originator |
| IG info2 | Collects overview information about the idea |
| PF.main | Home Page for Phase 1 Questions; central navigation point |
| PF.Q1–PF.Q10 | 1 Question & related rating statement per card (10 total) |
| ViewResponses | Presents text summary of questions, responses and ratings |
| Development Phase | Contains all cards for Phase 2 _ |
| CD.main | Home Page for Phase 2 Exercise (Templates) |
| CD.T1, CD.T1b, CD.T1c | Cards for Template 1 exercise |
| CD.T2, CD.T2b | Cards for Template 2 exercise |
| CD.T3, CD.T3b | Cards for Template 3 exercise |
| CD.T4 | Cards for Template 4 exercise |
| CD.T5 | Cards for Template 5 exercise |
| CD.T6, CD.T6b | Cards for Template 6 exercise |
| CD.T7, CD.T7b | Cards for Template 7 exercise |
| CD.T8, CD.T8b | Cards for Template 8 exercise |
| CD.T9, CD.T9b | Cards for Template 9 exercise |
| CD.T10, CD.T10b | Cards for Template 10 exercise |
| CD.T11, CD.T11b | Cards for Template 11 exercise |
| CD.T12, CD.T12b, CD.T12c | Cards for Template 12 exercise |
| Rating Phase | Contains all cards for Phase 3 _ |
| CR.main | Home Page for Phase 3 Rating Exercises |
| CR.arm5–CR.arm8 | Cards for ratings in 4 sub-areas of Market Assessment major area |
| CR.arm9–CR.arm12 | Cards for ratings in 4 sub-areas of Human Factors Assessment |
| CR.arm13–CR.arm16 | Cards for ratings in 4 sub-areas of Business Assessment major area |
| Evaluation Phase | Contains all cards for Phase 4 _ |
| IE info | Collects information about idea Evaluator (Decision Maker) |
| CE.main | Home Page for Phase 4 navigation |
| CE.1 | Presents graphical display for Marketing area ratings |
| CE.2 | Presents graphical display for Technical area ratings |
| CE.3 | Presents graphical display for Human Factors area ratings |
| CE.4 | Presents graphical display for Business area ratings |
| CE.5 | Presents combined graphical display for all ratings areas |
| CE.main2 | Provides text field for Idea Evaluator comments |
| Data | Stores Phase 1 data for various operations |
| PF.data | Holds Phase 1 data and responses for creating summary page and calculating phase 1 idea "filter score" |

APPENDIX A-continued

| SC Window names:<br>SC Card names: | Window Function:<br>Card Function: |
|---|---|
| TextFields | Stores text for all questions and rating statements |
| 10Questions | Stores 10 Phase 1 questions |
| 10Ratings | Stores 10 Phase 1 rating statements |
| CDquestions | Stores all Phase 2 Template questions and directions |
| MRatings | Stores rating statements for Marketing Assessment area |
| TRatings | Stores rating statements for Technical Assessment area |
| HFRatings | Stores rating statements for Human Factors Assessment area |
| BRatings | Stores rating statements for Business Assessment area |
| HelpText | Stores all text for on-line Help system (Guide/Advisor/Mentor) |
| Phase1.Guide, Phase2.Guide, Phase3.Guide, Phase4.Guide | Stores Guide information text for Phases 1–4 |
| Phase1.Advisor, Phase2.Advisor, Phase3.Advisor, Phase4.Advisor | Stores Advisor information text for Phases 1–4 |
| Phase1.Mentor, Phase2.Mentor, Phase3.Mentor, Phase4.Mentor | Stores Mentor information text for Phases 1–4 |
| Idea Summary | Presents Idea Submitter, Originator, & Evaluator Information |
| Idea Summary | Summary of Idea Submitter, Originator, & Evaluator info |
| Idea Summary2 | Additional Idea information if available |
| Mentor | Window for presenting Mentor information |
| GD1 | Card to present Mentor information |
| GD2 | 2nd version of Mentor information card for certain contexts |
| Advisor | Window for presenting Advisor information |
| AD1 | Card to present Advisor information |
| AD2 | 2nd version to Advisor information card for certain contexts |
| Q1 | Presents Advisor information about rating 1 (if applicable) |
| Q2 | Presents Advisor information about rating 2 (if applicable) |
| Q3 | Presents Advisor information about rating 3 (if applicable) |
| Q4 | Presents Advisor information about rating 4 (if applicable) |
| Q5 | Presents Advisor information about rating 5 (if applicable) |
| Q6 | Presents Advisor information about rating 6 (if applicable) |
| Mentor | Window for presenting Mentor information |
| MN1 | Card to present Mentor information |
| Untitled | Non-functional empty Window, used only for development |
| Tool Palette | Non-functional, eventually will enable graphics creation |
| Paint | Paint tools menu; currently non-functional |
| Draw | Draw tools menu; currently non-functional |

APPENDIX B

| Variable names: | Variable functions: |
|---|---|
| UserLocation | Holds the current or most recent location of the user in the VM |
| nodate | Indicates whether or not the data saving routines should be executed (values = Yes and No) |
| dataset | Holds all idea information when writing to/reading from the Idea Catalog |
| guideset | Holds non-idea information when writing to/reading from the Idea Catalog |
| value 1–value 10 | Values for 10 Phase 1 Ratings |
| Qbegin, CDbegin, CRbegin, CEbegin | Holds the data on which phases 1, 2, 3, and 4 were begun, respectively |
| Qend, CDend, CRend, CEend | Holds the date on which phases 1, 2, 3, and 4 were completed, respectively |
| Qstatus, CDstatus, CRstatus, CEstatus | Holds the current completion status of phases 1, 2, 3, and 4, respectively (values = New, In Progress, and Completed) |
| Qscore | Holds the average value of the 10 phase 1 ratings |
| w11, w12, w13, w14 | Importance weightings pre-assigned to the 4 sub-areas in the Market Assessment Area |
| w21, w22, w23, w24 | Importance weightings pre-assigned to the 4 sub-areas in the Technical Assessment Area |
| w31, w32, w33, w34 | Importance weightings pre-assigned to the 4 sub-areas in the Human Factors Assessment Area |

APPENDIX B-continued

| Variable names: | Variable functions: |
|---|---|
| w41, w42, w43, w44 | Importance weightings pre-assigned to the 4 sub-areas in the Business Assessment Area |
| asw1, asw2, asw3, asw4 | Sum of 4 sub-area importance weightings for each of the 4 major Assessment Areas |
| s11, s12, s13, s14 | Average rating for the statements in each of the 4 sub-areas in the Market Assessment Area (Phase 3) |
| s21, s22, s23, s24 | Average rating for the statements in each of the 4 sub-areas in the Technical Assessment Area (Phase 3) |
| s31, s32, s33, s34 | Average rating for the statements in each of the 4 sub-areas in the Human Factors Assessment Area (Phase 3) |
| s41, s42, s43, s44 | Average rating for the statements in each of the 4 sub-areas in the Business Assessment Area (Phase 3) |

What is claimed is:

1. A method for evaluating a business proposal comprising the steps, performed by a computer, of:
    presenting a set of predefined questions regarding the proposal;
    obtaining a set of information about the proposal from responses to the questions;
    determining a score from the information in the set;
    determining, from the score, whether the set meets a predetermined minimum specification; and
    outputting the score and the obtained information for the purposes of evaluating the proposal.

2. The method of claim 1, further including the steps of
    providing, from the obtained responses, feedback regarding the information; and
    obtaining additional information about the proposal from responses received after the feedback is provided.

3. The method of claim 1, wherein the step of outputting the information and score includes the step of displaying the information and score.

4. The method of claim 1, further including the step of obtaining information about a generator of the proposal.

5. The method of claim 1, further including the step of providing a first level of help including general information on using the program and information about the status of the proposal.

6. The method of claim 5 further including the step of providing a second level of help including context specific information regarding the set of questions.

7. The method of claim 1 further including the step of storing the proposal information in a database.

8. The method of claim 1 further including the step of
    receiving information about the proposal from a plurality of sources.

9. The method of claim 1, wherein the set of questions include questions regarding a level of agreement with a set of predefined statements;
    wherein the obtained set of information includes a numeric rating of the level of agreement with each statement; and
    wherein the information provided for evaluation includes the obtained ratings.

10. The method of claim 9, further comprising, if the obtained score meets the minimum specification, the steps of
    presenting a second set of predefined questions that includes questions regarding a level of agreement with a second set of predefined statements, and
    obtaining a second set of information that includes responses to the second set of questions including a numeric rating indicating a person's level of agreement with each statement in the second set of statements, and a numeric rating indicating the person's level of confidence in the numeric rating indicating the person's level of agreement with the second set of statements; and
    wherein the outputting step includes the step of outputting the second set of information and ratings for the purposes of evaluating the proposal.

11. The method of claim 9, further comprising the step of displaying a graphical representation of the ratings.

12. The method of claim 10, further comprising the step of
    determining a score for the second set of information.

13. A computer for evaluating a business proposal, comprising:
    means for presenting a set of predefined questions regarding the proposal;
    means for obtaining a set of information about the proposal from responses to the questions;
    means for determining a score from the information in the set;
    means for determining, from the score, whether the set meets a predetermined minimum specification; and
    means for outputting the score and the obtained information for the purposes of evaluating the proposal.

14. The computer of claim 13, further comprising
    means for providing, from the obtained responses, feedback regarding the information; and
    means for obtaining additional information about the proposal from responses received after the feedback is provided.

15. The computer of claim 13, wherein the means for outputting the score and information includes
    means for displaying the information and score.

16. The computer of claim 13, further comprising
    means for obtaining information about a generator of the proposal.

17. The computer of claim 13, further comprising
    means for providing a first level of help including general information on using the program and information about the status of the proposal.

18. The computer of claims 13, further comprising
    means for providing a second level of help including context specific information regarding the set of questions.

19. The computer of claims 13, further comprising
    means for storing the proposal information in a database.

20. The computer of claim 13, further comprising means for receiving information about the proposal from a plurality of sources.

21. The computer of claim 13, wherein the set of predefined questions includes questions regarding a level of agreement with a set of predefined statements, and wherein the obtained set of information includes a numeric rating of the level of agreement with each statement.

22. The computer of claim 21, further comprising:

means for presenting a second set of predefined questions including questions regarding a level of agreement with a second set of predefined statements, and means for obtaining a second set of information including responses to the second set of questions, the responses including a numeric rating indicating a level of agreement with each statement in the second set of statements, and a numeric rating indicating a level of confidence in the numeric rating indicating the level of agreement with the second set of statements; and wherein the outputting means includes means for outputting the second set of information and ratings for the purposes of evaluating the proposal.

23. The computer of claim 21, further comprising means for providing a graphical representation of the ratings.

24. The computer of claim 22, further comprising means for determining a score for the second set of obtained information.

* * * * *